(12) United States Patent
Lin et al.

(10) Patent No.: US 12,141,311 B2
(45) Date of Patent: Nov. 12, 2024

(54) DATA TRANSMISSION METHOD AND APPARATUS, DEVICE, STORAGE MEDIUM, AND COMPUTER PROGRAM PRODUCT

(71) Applicant: TENCENT TECHNOLOGY (SHENZHEN) COMPANY LTD, Guangdong (CN)

(72) Inventors: Feng Lin, Guangdong (CN); Jiyi Yin, Guangdong (CN); Zian Wang, Guangdong (CN); Guangmin Huang, Guangdong (CN); Zhixiang Zhang, Guangdong (CN); Jiaqi Xiong, Guangdong (CN); Yuanyuan Hong, Guangdong (CN); Rong Song, Guangdong (CN); Weixin Qiu, Guangdong (CN); Xiaoqian Huang, Guangdong (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 218 days.

(21) Appl. No.: 17/989,230

(22) Filed: Nov. 17, 2022

(65) Prior Publication Data
US 2023/0078667 A1  Mar. 16, 2023

Related U.S. Application Data

(63) Continuation of application No. PCT/CN2021/138369, filed on Dec. 15, 2021.

(30) Foreign Application Priority Data

Dec. 29, 2020 (CN) .......................... 202011602703.3

(51) Int. Cl.
G06F 21/62 (2013.01)
G06F 21/34 (2013.01)

(52) U.S. Cl.
CPC .......... G06F 21/6218 (2013.01); G06F 21/34 (2013.01)

(58) Field of Classification Search
CPC .................................................. G06F 21/6218
See application file for complete search history.

(56) References Cited

U.S. PATENT DOCUMENTS

| 10,268,832 B1 | 4/2019 | Ciubotariu et al. |
| 2005/0097441 A1* | 5/2005 | Herbach ................. G06F 21/10 715/229 |

(Continued)

FOREIGN PATENT DOCUMENTS

| CN | 101339503 A | 1/2009 |
| CN | 109977040 A | 7/2019 |

(Continued)

OTHER PUBLICATIONS

International Search Report for PCT/CN2021/138369 dated Feb. 21, 2022.
Written Opinion for PCT/CN2021/138369 dated Feb. 21, 2022.

*Primary Examiner* — Bradley W Holder
(74) *Attorney, Agent, or Firm* — Sughrue Mion, PLLC

(57) ABSTRACT

A data transmission method includes running a first application program on a first terminal, responding to an operation request for a document in the first application program to acquire a request object identifier and a document identifier of the document; acquiring a permission object group identifier of the document according to the document identifier, sending a permission authentication request for the request object identifier to the second application program, the permission authentication request being used to trigger the second application program to perform authentication processing on the request object identifier according to the permission object group identifier and return an authentication result, and outputting a response page of the operation (Continued)

request according to the authentication result returned from the second application program.

20 Claims, 8 Drawing Sheets

(56) References Cited

U.S. PATENT DOCUMENTS

| | | | | |
|---|---|---|---|---|
| 2011/0134471 A1* | 6/2011 | Kimura | ............... | G06F 3/1288 |
| | | | | 358/1.15 |
| 2013/0198807 A1* | 8/2013 | Herbach | ............ | G06F 21/6218 |
| | | | | 726/4 |
| 2013/0212707 A1* | 8/2013 | Donahue | ............ | G06F 21/6218 |
| | | | | 726/29 |

FOREIGN PATENT DOCUMENTS

| | | | |
|---|---|---|---|
| CN | 111555893 A | | 8/2020 |
| CN | 112035861 A | | 12/2020 |
| CN | 112765648 A | | 5/2021 |

* cited by examiner

DATA TRANSMISSION METHOD AND APPARATUS, DEVICE, STORAGE MEDIUM, AND COMPUTER PROGRAM PRODUCT

CROSS-REFERENCE TO RELATED APPLICATIONS

This application is a continuation application of International Application No. PCT/CN2021/138369, filed on Dec. 15, 2021, which claims priority to Chinese Patent Application No. 202011602703.3, filed with the China National Intellectual Property Administration on Dec. 29, 2020, the disclosures of each of which being incorporated by reference in their entireties.

FIELD

The present disclosure relates to the field of computer technologies, and in particular, to a data transmission method, a data transmission apparatus, an electronic device, a computer-readable storage medium, and a computer program product.

BACKGROUND

An online collaboration document (hereinafter referred to as a document) in a first application program (which may be a document application program, for example) is a document that supports online editing and collaborative editing by multiple collaborators (also referred to as collaboration objects). The collaboration object of a document is at least one user (also referred to as an object) who possesses an operation permission of the document. For example, the collaboration object can view or edit the document, etc.

In the related art, the collaboration object is added and set one by one by the first application program, information (including object information and permission information) of the collaboration object is managed by the first application program. When the collaboration object operates on the document, the first application program performs authentication according to the information of the collaboration object. There are some problems in the above solutions. First, the information of the collaboration object is required to be completely exposed to the first application program, which is a prerequisite for adding a collaboration object, so that privacy protection for the information of the collaboration object cannot be performed. Second, the setting efficiency of the collaboration object is low, and the maintenance cost is high.

SUMMARY

According to various embodiments, a data transmission method, performed by a first terminal, may include: running a first application program on the first terminal; responding to an operation request for a document in the first application program to acquire a request object identifier and a document identifier of the document; acquiring a permission object group identifier of the document according to the document identifier, the permission object group identifier being used to represent a permission object group possessing an operation permission of the document, the permission object group being created by a second application program, and the permission object group including a plurality of authorization object identifiers; sending a permission authentication request for the request object identifier to the second application program, the permission authentication request being used to trigger the second application program to perform authentication processing on the request object identifier according to the permission object group identifier and return an authentication result, and the permission authentication request including the permission object group identifier and the request object identifier; and outputting a response page of the operation request according to the authentication result returned from the second application program.

According to various embodiments a data transmission method, performed by a first terminal, may include: receiving a permission authentication request for a request object identifier sent by a first application program, the permission authentication request including a permission object group identifier and the request object identifier, where the first application program is run on the first terminal, and the first application program responds to an operation request of a document in the first application program to acquire the request object identifier and a document identifier of the document, and acquires a permission object group identifier of the document according to the document identifier, the permission object group identifier being used to represent a permission object group possessing an operation permission of the document, the permission object group being created by a second application program, and the permission object group including a plurality of authorization object identifiers; performing authentication processing on the request object identifier according to the permission object group identifier, to obtain an authentication result; and sending the authentication result to the first application program.

According to various embodiments, a data transmission apparatus, an electronic device, a non-transitory computer-readable storage medium, and a non-transitory computer program product or a computer program consistent with the data acquisition methods may also be provided.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
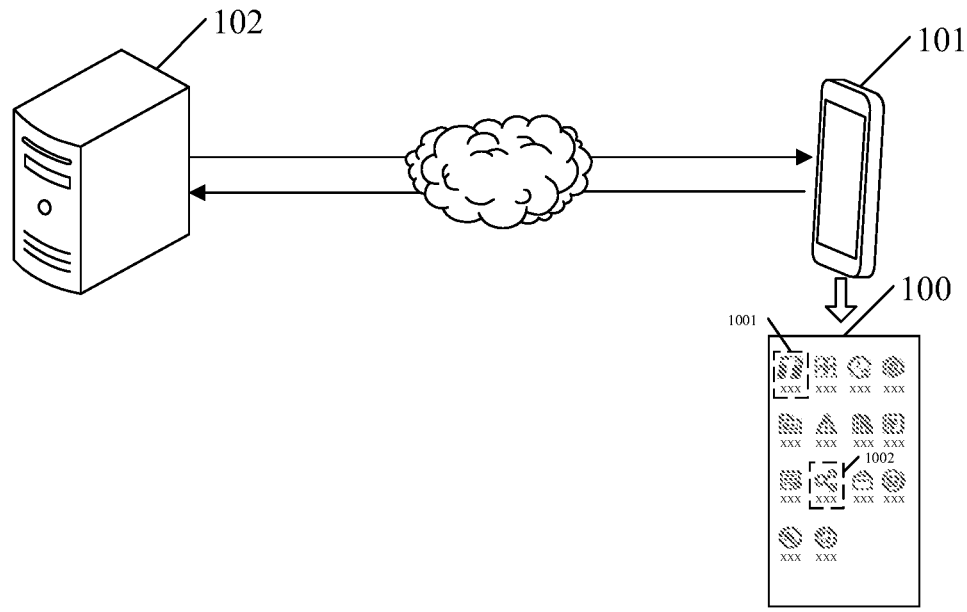
FIG. 1 is a schematic architectural diagram of a data transmission system according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Some embodiments have the following beneficial effects:

By means of a permission object group, a permission object group containing a plurality of authorization objects may be added and set at a time, to authorize a document to a plurality of collaboration objects, so that the setting efficiency of the collaboration objects is effectively improved. The permission object group is created and managed by a second application program, and information of each object in the permission object group need not be exposed to the first application program, so that privacy protection for the information of each object in the permission object group can be performed efficiently, and the information security is improved. When a request object initiates an operation request to a document in the first application program, the second application program performs authentication, so that the processing burden of the first application program can be effectively shared, and the document data processing efficiency can be improved.

Some embodiments relate to an online collaboration document. The online collaboration document (hereinafter referred to as a document) is a document that supports online editing, online storage, and collaborative editing by multiple collaboration objects. The collaboration object of a document may be an authorization object of the document, that is, one or more objects that possess an operation permission of the document and can operate on the document. The operation permission herein includes, but is not limited to, a viewing permission, a modifying permission, and the like. That is, the collaboration object possessing the viewing permission can view the document, and the collaboration object possessing the editing permission can edit the document.

The first application program refers to a document application program that can manage the document. That is, document creation, document operation, document permission management, document storage, and the like may be implemented through the first application program. The first application program supports the setting of a first-type collaboration object of the document. The so-called first-type collaboration object refers to one or more objects possessing an operation permission of the document and can operate on the document after the operation permission is configured by the first application program, and the first-type collaboration object is managed by the first application program. The first application program may set an object in a second application program as the first-type collaboration object of the document. The second application program refers to an application program other than the first application program. For example, the second application program may be an instant messaging application program, a social session application program, or the like.

For example, the first application program is a document application program and the second application program is an instant messaging application program, and a specific scenario of setting the first-type collaboration object is as follows: When a first object of the instant messaging application program intends to set a second object of the instant messaging application program as a first-type collaboration object through the document application program, the document application program needs to acquire object information of the second object (which may be an identifier of the second object, for example) and permission information (which may be the type of operation permission, for example) from the instant messaging application program. In this way, the document application program may configure a corresponding operation permission for the second object, and set the second object as the first-type collaboration object of the document. Alternatively, when the first object of the instant messaging application program intends to set a plurality of second objects in a multi-person session chat of the instant messaging application program as the first-type collaboration object through the document application program, the document application program needs to acquire object information of each second object in the multi-person session chat and permission information from the instant messaging application program. In this way, the document application program may sequentially configure a corresponding operation permission for each second object in the multi-person session chat, and set the plurality of second objects in the multi-person session chat as the first-type collaboration object of the document one by one. It can be seen that, the first-type collaboration object is set for a single object, and the first application program needs to set the first-type collaboration object one by one. The first-type collaboration object is managed by the first application program. The first application program needs to manage information of the first-type collaboration object (including object information and permission information), so that the information of the first-type collaboration object in the second application program is completely exposed in the first application program. In addition, when there is an operation request initiated for a document in the first application program, the first application program needs to authenticate a request object according to the information of the first-type collaboration object.

Based on the need for privacy protection of the information of the collaboration object, some embodiments propose a concept of a second-type collaboration object. The so-called second-type collaboration object refers to a permission object group created and managed by the second application program. The permission object group includes one or more authorization object identifiers, and authorization objects corresponding to each of the authorization object identifiers in the permission object group possess the operation permission of the document. The permission object group is managed by the second application program, and the permission object group identifier of the permission object group (also referred to as the permission group collaboration object identifier) is managed by the first application program. The biggest difference between the first-type collaboration object and the second-type collaboration object is that whether an object is the second-type collaboration object of the document is not set or determined by the first application program, but by the second application program.

For example, the first application program is a document application program and the second application program is an instant messaging application program, and a specific scenario of setting the second-type collaboration object is as follows: The instant messaging application program is created by an enterprise. When an object of the instant messaging application program (which may be an administrator of the instant messaging application program or an arbitrarily designated object, for example) intends to set all objects in a department of the enterprise as the second-type collaboration object of the document, the instant messaging application program applies to the document application program for the permission object group identifier of the permission object group. After the instant messaging application program receives the permission object group identifier generated by the document application program for the permission object group, the instant messaging application program may create the permission object group according to the permission object group identifier, and add the object information (which may be the authorization object identifier, for example) of all objects in the department and the permission information (which may be the type of operation permission, for example) to the permission object group. The permission object group is the second-type collaboration object of the document, and the authorization object corresponding to each authorization object identifier in the permission object group possesses the operation permission of the document. It can be seen that, by means of the permission object group, a permission object group may be added and set as the second-type collaboration object of the document at a time, so that the setting efficiency of the collaboration object is effectively improved. Moreover, the permission object group is created and managed by the second application program, and information of each object in the permission object group need not be exposed to the first application program, so that the need of privacy protection for the information of each object in the permission object group is satisfied. In addition, when the request object initiates an operation request to the document in the first application program, the second application program performs the authentication based on the information of the collaboration object in the permission object group, so that the processing burden of the first application program can be effectively shared, and the management and maintenance cost can be reduced.

The document and the second application program mentioned in some embodiments are associated with each other. For example, the document may be published to the first application program by an object of the second application program (which may be an administrator of the second application program or any designated object in the second application program, for example).

The composition of the first application program and the second application program mentioned in some embodiments is briefly described below. The first application program may be a web application program, a mobile or desktop application program, a mini program, or the like. The first application program includes a client of the first application program, an open background of the first application program, and a permission background of the first application program. The second application program includes a client of the second application program and a background of the second application program.

1. First Application Program (1) The open background of the first application program is used to establish a communication connection between the permission background of the first application program and the second application program, to implement data interaction between the permission background of the first application program and the second application program.

(2) The permission background of the first application program is used to perform permission management on a document in the first application program based on a permission management request of the client of the first application program. The permission management request includes a collaboration object addition request or a collaboration object deletion request. The permission background of the first application program maintains a document collaboration object list of the document. The document collaboration object list includes one or more collaboration object identifiers (which may be a first-type collaboration object identifier or a permission object group identifier (that is, a second-type collaboration object identifier), for example). Each collaboration object identifier in the document collaboration object list possesses the operation permission of the document. The permission background of the first application program adds, based on a collaboration object addition request of the client of the first application program, a target object identifier or a target permission object group identifier selected by the client of the first application program to the document collaboration object list, the collaboration object addition request carrying (including) the target object identifier or the target permission object group identifier to be added. The permission background of the first application program may also delete, based on a collaboration object deletion request of the client of the first application program, one or more target collaboration object identifiers selected by the client of the first application program in the document collaboration object list from the document collaboration object list. The object or permission object group corresponding to the deleted target collaboration object identifier no longer possesses the operation permission of the document. The collaboration object deletion request carries the one or more target collaboration object identifiers to be deleted.

(3) The client of the first application program is used to display the document in the first application program and provide some operation options of the document, such as an editing option (for example, a font option, a paragraph option, or the like), a storage option, and a permission application option. The client of the first application program may be further used to display the document collaboration object list, and provide a collaboration object addition option or a collaboration object deletion option. When the collaboration object addition option is selected, the client of the first application program may display an object identifier list. The object identifier list may include one or more object identifiers and one or more permission object group identifiers. When a target object identifier or a target permission object group identifier in the object identifier list is selected, the client of the first application program sends the collaboration object addition request to the permission background of the first application program, the collaboration object addition request carrying the selected target object identifier or target permission object group identifier. When the object selects one or more target collaboration object identifiers in the document collaboration object list and selects the collaboration object deletion option, the client of the first application program sends the collaboration object deletion request to the permission background of the first application program, the collaboration object deletion request carrying the one or more selected target collaboration object identifiers. The client of the first application program may further display an updated document collaboration object list after the permission background of the first application program adds or deletes the collaboration object identifier.

2. Second Application Program (1) The background of the second application program is used to create the permission object group. The background of the second application program may also manage the permission object group based on a permission object group management request of the client of the second application program, the permission object group management request includes an object addition request or an object deletion request. The permission object group includes one or more authorization object identifiers, and each authorization object identifier in the permission object group possesses the operation permission of the document. The background of the second application program may add, based on the object addition request of the client of the second application program, one or more target organization object identifiers selected by the client of the second application program to the permission object group, the object addition request carrying the one or more target organization object identifiers to be added. The background of the second application program may alternatively delete, based on the object deletion request of the client of the second application program, one or more target authorization object identifiers selected by the client of the second application program in the permission object group from the permission object group. An organization object corresponding to the deleted target authorization object identifier no longer possesses the operation permission of the document. The object deletion request carries at least one target authorization object identifier (that is, the one or more target authorization object identifiers) to be deleted.

(2) The client of the second application program is used to display the permission object group and provide an object addition option or an object deletion option. When the object addition option is selected, the client of the second application program may display an organization object identifier list. The organization object identifier list includes at least one organization object identifier. Each organization object identifier in the organization object identifier list belongs to the second application program, that is, the organization object corresponding to each organization object identifier in the organization object identifier list is a member of the second application program (which may be a member successfully registered the second application program, or a member of the enterprise or organization that creates the second application program, for example). When at least one target organization object identifier in the organization object identifier list is selected by the target object (which may be an administrator of the second application program or any specified object in the second application program, for example), the client of the second application program sends the object addition request to the background of the second application program, the object addition request carrying the at least one target organization object identifier selected. When the target object selects at least one target authorization object identifier in the permission object group and the object deletion option is selected, the client of the second application program sends the object deletion request to the background of the second application program, the object deletion request carrying the at least one target authorization object identifier selected. The client of the second application program may further display an updated permission object group after the background of the second application program adds or deletes the authorization object identifier. The client of the second application program may further provide a document entry through which the document in the first application program may be accessed.

In order to better understand the data transmission solution provided in some embodiments, FIG. 1 shows a data transmission system applicable to the data transmission solution. As shown in FIG. 1, the data transmission system includes a terminal 101 and a server 102. The terminal 101 may be a device with a display function, such as a smartphone, a tablet computer, a notebook computer, a desktop computer, a smart speaker, a smartwatch, an in-vehicle device, or a smart wearable device, but the terminal 101 is not limited thereto. The server 102 may be an independent physical server, or may be a server cluster including a plurality of physical servers or a distributed system, or may be a cloud server providing a cloud computing service, which is not limited thereto. The terminal 101 and the server 102 may be directly or indirectly connected in a wired or wireless communication manner, which is not limited thereto.

As shown in FIG. 1, a client of a first application program and a client of a second application program are run on the terminal 101, and an icon 1001 of the client of the first application program and an icon 1002 of the client of the second application program are displayed in a service interface 100 of the terminal 101.

The client of the first application program and the client of the second application program may be run on the same terminal. For example, both the client of the first application program and the client of the second application program are run on the terminal 101. The client of the first application program and the client of the second application program may alternatively be run on different terminals. For example, the client of the first application program is run on a first terminal, and the client of the second application program is run on a second terminal.

An open background of the first application program, a permission background of the first application program, and a background of the second application program may be deployed in the same server. For example, the open background of the first application program, the permission background of the first application program, and the background of the second application program are deployed in the server 102. The open background of the first application program, the permission background of the first application program, and the background of the second application program may alternatively be deployed in different servers. For example, the open background of the first application program is deployed in a first server, the permission background of the first application program is deployed in a second server, and the background of the second application program is deployed in a third server. Alternatively, the open background of the first application program and the permission background of the first application program are deployed in the first server, and the background of the second application program is deployed in the second server.

As an example, the first application program is the document application program, and the second application program is the instant messaging application program. The object (for example, a user account logged in to the document application program) acquires, for an editing request initiated for a document in the document application program, a document identifier of the document and a request object identifier. The document application program acquires a permission object group identifier of the document according to the document identifier, and sends a permission authentication request to the instant messaging application program. The instant messaging application program returns an authentication result, and the document application program outputs a response page of an operation request according to the authentication result. In this way, a plurality of collaboration objects can edit the document collaboratively, and the document data processing efficiency of the document application program can be improved. Each document possesses a corresponding document identifier, and the document is uniquely identified by the document identifier. The object that initiates a request in the first application program has a corresponding request object identifier, and a request object corresponding to the first application program is uniquely identified by the request object identifier. The permission object group identifier is used to identify a permission group collaboration object.

The document identifier corresponding to each document and the request object identifier of the object are stored in the first application program in advance. A storage position of the document identifier and the request object identifier of the object includes a terminal local storage unit running the first application program, an external database corresponding to the first application program, a background corresponding to the first application program, and the like. When the object logged into the first application program (which may be a collaboration object in the permission group collaboration object) initiates an operation on the document in the document application program (for example, the object opens a document in the document application program and clicks on an editing entry (for example, a document centering button or an image insertion button) of the document, or the object clicks on a document and needs to view the document), the first application program automatically generates an operation request (for example, an editing request or a viewing request) for the document in the first application program based on the operation on the document by the object. And, based on the operation request, the first application program automatically acquires, from the storage position, the request object identifier of the object and the document identifier of the document, for which the operation request is initiated, in the first application program.

In an interaction process constructed for the permission object group by the first application program and the second application program, the first application program generates a corresponding permission object group identifier for the permission object group and stores the permission object group identifier corresponding to each document. A storage position of the permission object group identifier includes the terminal local storage unit running the first application program, the external database corresponding to the first application program, the background corresponding to the first application program, and the like. After the document identifier of the document is acquired for the editing request initiated for the document in the document application program, the permission object group identifier of the document is automatically acquired from the storage position according to the document identifier.

It may be understood that, the data transmission system described in some embodiments aims to describe the technical solutions of some embodiments more clearly, but does not constitute a limitation on the technical solutions of some embodiments. A person of ordinary skill in the art may know that, as a network architecture evolves and a new service scenario emerges, the technical solutions provided in some embodiments are also applicable to similar technical problems.

The operation of the data transmission system shown in FIG. 1 may be divided into three stages: a permission object group creation stage, a permission object group binding stage, and an authentication stage. The three stages are separately described below:

(1) Permission Object Group Creation Stage

Figure 2:
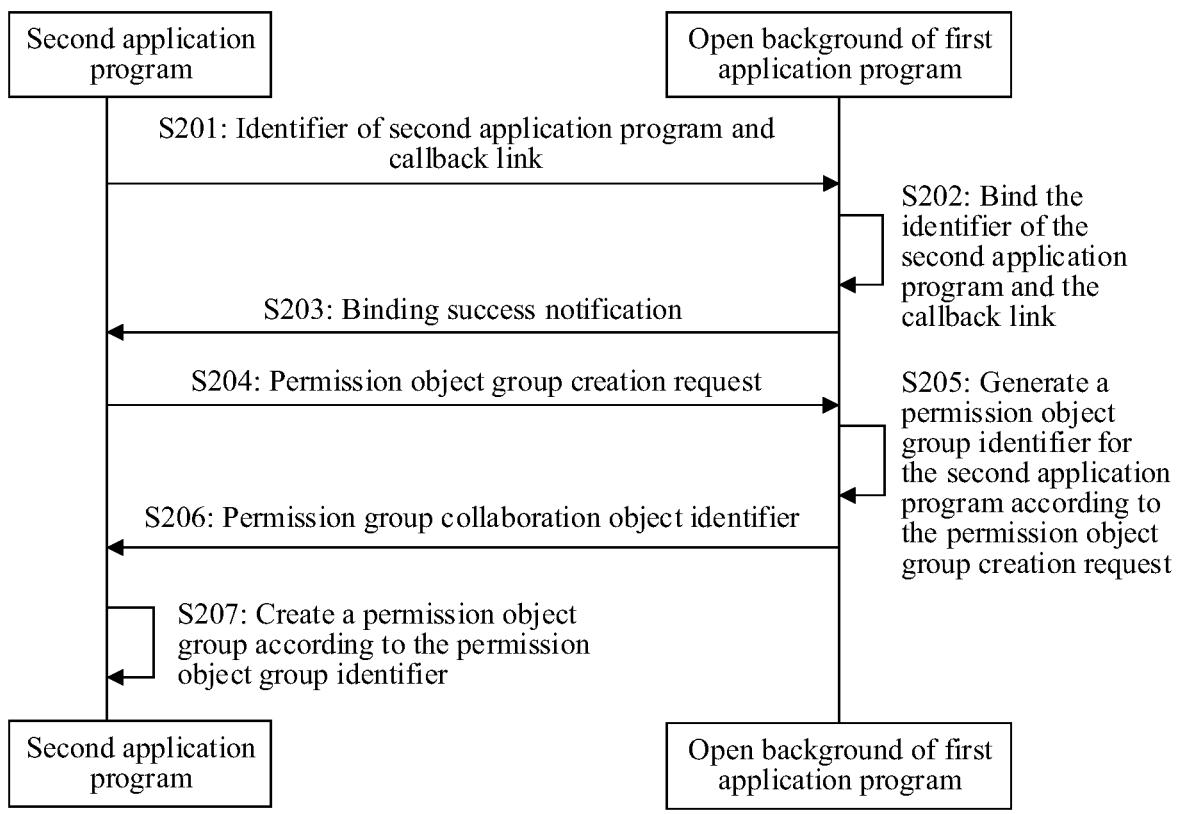
FIG. 2 is a schematic flowchart of a permission object group creation stage according to some embodiments.

FIG. 2 is a schematic flowchart of a permission object group creation stage according to some embodiments. As shown in FIG. 2, the permission object group creation stage includes the following operations S201 to S207:

Operation S201: A second application program sends an application program identifier of the second application program and a callback link to an open background of a first application program.

The application program identifier of the second application program is generated for the second application program by an open background of the first application program, and the application program identifier of the second application program can uniquely identify the second application program. The callback link is used to access the second application program. For example, the callback link includes an access address of the second application program. Here, the callback link may be a link formulated according to a specification of the second application program; or may be a standardized callback link formulated according to a specification recognized by both the first application program and the second application program. The standardized callback link may include a standard procedure of accessing the second application program, such as a time to enable the standardized callback link, and a manner of transmitting parameters (such as a permission group collaboration identifier and a request object identifier) into the standardized callback link.

Operation S202: The open background of the first application program binds the application program identifier of the second application program and the callback link.

The open background of the first application program binds the application program identifier of the second application program and the callback link, that is, the open background of the first application program stores the application program identifier of the second application program and the callback link in an associated manner. The callback link associated with the application program identifier of the second application program may be determined by the application program identifier of the second application program, and the application program identifier of the second application program associated with the callback link may also be determined by the callback link.

Operation S203: The open background of the first application program sends a binding success notification to the second application program.

For example, after the open background of the first application program successfully binds the application program identifier of the second application program and the callback link, a binding success notification is sent to the second application program, the binding success notification being used to indicate that the application program identifier of the second application program and the callback link are successfully bound.

Operations S201 to S203 are the process of binding the application program identifier of the second application program and the callback link in the open background of the first application program. In an implementation, operation S201 may be implemented in the following manner: The second application program may send the application program identifier of the second application program and the callback link to the open background of the first application program immediately when obtaining the application program identifier of the second application program generated by the open background of the first application program. In an implementation, operation S201 may be implemented in the following manner: The second application program may send a binding request to the open background of the first application program at any moment after obtaining the application program identifier of the second application program generated by the open background of the first application program, the binding request carrying the application program identifier of the second application program and the callback link. In an implementation, operation S201 may be implemented in the following manner: The second application program may send a binding request to the open background of the first application program at any moment after obtaining the application program identifier of the second application program generated by the open background of the first application program, the binding request carrying the application program identifier of the second application program, an access address of the second application program, and an indication of enabling the standardized callback link. In this implementation, operation S202 may be implemented in the following manner: The open background of the first application program enables the standardized callback link according to the indication of the binding request of the second application program, transmits the access address of the second application program in the standardized callback link, and binds the standardized callback link with the access address transmitted and the application program identifier of the second application program.

Operation S204: The second application program sends a permission object group creation request to the open background of the first application program.

The permission object group creation request may carry the application program identifier of the second application program and the document identifier of the document. An exemplary permission object group creation request may be "POST/openapi/xxxxx/v1/groups", and the permission object group creation request may request the open background of the first application program to open an application programming interface (API) related to the creation of the permission object group.

For example, the first application program is the document application program, and the second application program is the instant messaging application program. A group that can operate on the document is created in the instant messaging application program, and the instant messaging application program can automatically generate the permission object group creation request, the permission object group creation request including the document identifier and the application program identifier of the instant messaging application program.

Operation S205: The open background of the first application program generates a permission object group identifier for the second application program according to the permission object group creation request.

The open background of the first application program may generate a permission object group identifier for the document for the second application program according to the application program identifier of the second application program and the document identifier carried by the permission object group creation request, and store the application program identifier of the second application program, the callback link, the document identifier, and the permission object group identifier in an associated manner. The permission object group identifier is used to represent a permission object group possessing the operation permission of the document, and the permission object group includes a plurality of authorization object identifiers (authorized collaboration object identifiers). If the first application program contains a plurality of documents associated with the second application program, the open background of the first application program may respectively generate a permission object group identifier for each document. In this way, different operation permissions may be configured for different documents. For example, a viewing permission is configured for a permission object group identifier corresponding to a first document, and an editing permission is configured for a permission object group identifier corresponding to a second document. Therefore, the operation permission of the document is more diversified. By setting the permission object group for the document, a permission object group may be added and set as the collaboration object of the document at a time, which avoids setting permissions for the plurality of permission objects in sequence, thereby effectively improving the setting efficiency of the collaboration object and improving the efficiency of the document data transmission. The open background of the first application program may also jointly generate a permission object group identifier for all documents, so that when there are a large number of documents associated with the second application program in the first application program, it is convenient to manage the documents, thereby improving the document processing efficiency. Some embodiments are described using an example in which the open background of the first application program generates a permission object group identifier for each document.

Operation S206: The open background of the first application program sends the permission object group identifier to the second application program.

The open background of the first application program may return the permission object group identifier to the second application program through the API associated with the permission object group creation.

Operation S207: The second application program creates a permission object group according to the permission object group identifier.

As shown in FIG. 2, through the collaboration between the second application program and the open background of the first application program, the second application program successfully creates a permission object group of the document.

(2) Permission Object Group Binding Stage

Figure 3:
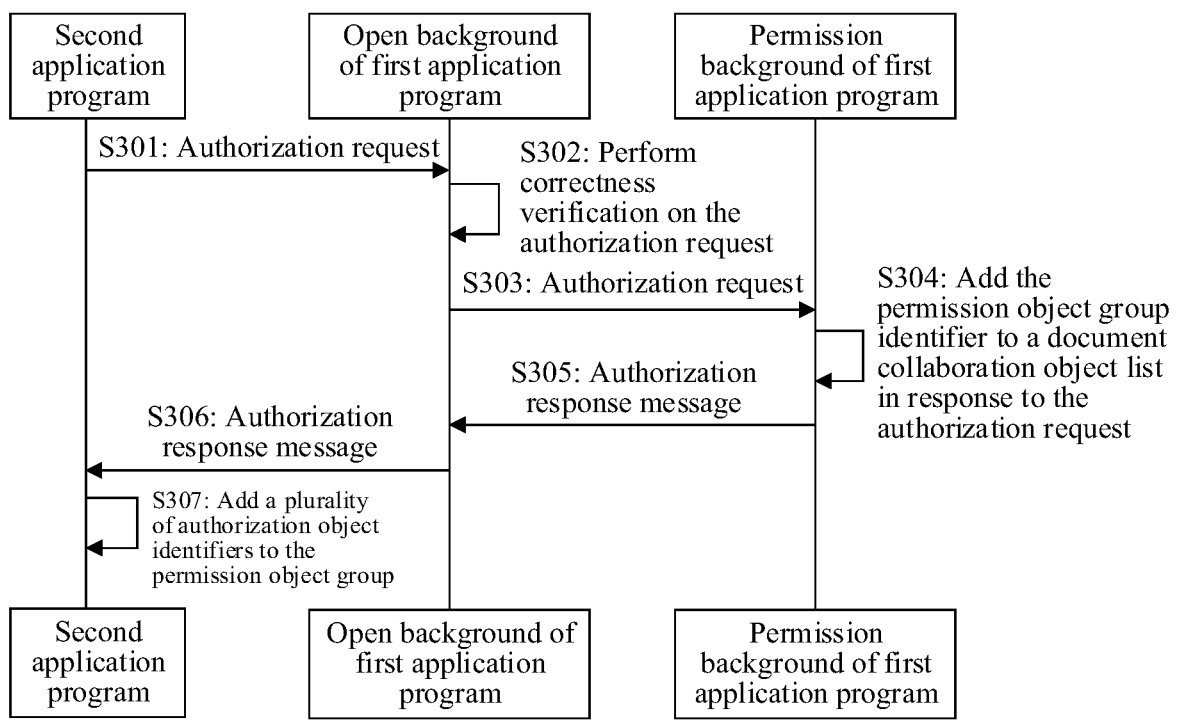
FIG. 3 is a schematic flowchart of a permission object group binding stage according to some embodiments.

FIG. 3 is a schematic flowchart of a permission object group binding stage according to some embodiments. As shown in FIG. 3, the permission object group creation stage includes the following operations S301 to S307:

Operation S301: The second application program sends an authorization request to the open background of the first application program.

The authorization request may carry the permission object group identifier, the application program identifier of the second application program, the document identifier (which may be a document ID or a document link, for example), the type of operation permission, and the like. An exemplary authorization request may be "PATCH/openapi/xxxxx/v1/files/{fileID}/members", and the authorization request may request the open background of the first application program to start an API related to the binding with the permission object group.

Operation S302: The open background of the first application program performs correctness verification on the authorization request.

For example, the open background of the first application program performing correctness verification on the authorization request may refer to the open background of the first application program verifying whether the content carried by the authorization request is correct and credible. For example, the open background of the first application program verifies whether the format of the document identifier is a standard document identifier format specified by the first application program; or the open background of the first application program verifies whether the permission object group identifier, the application program identifier of the second application program, and the document identifier carried by the authorization request are the same as the permission object group identifier, the application program identifier of the second application program, and the document identifier stored in the open background of the first application program in an associated manner. By performing the correctness verification on the authorization request, the authorization operation can be performed on the permission object group only when the authorization request passes the correctness verification, thereby ensuring that the object in the permission object group has a permission to operate the document and avoiding that any object can operate the document, which ensures the security of document data transmission.

Operation S303: The open background of the first application program sends the authorization request to a permission background of the first application program when the authorization request passes the correctness verification.

Operation S304: The permission background of the first application program adds the permission object group identifier to a document collaboration object list of the document based on the authorization request.

For example, the document collaboration object list includes a plurality of collaboration object identifiers of the document, and each collaboration object identifier in the document collaboration object list possesses the operation permission of the document. The permission background of the first application program may add, based on the authorization request, the permission object group identifier to the document collaboration object list and configure the type of operation permission requested by the second application program for the permission object group identifier.

Operation S305: The permission background of the first application program sends an authorization response message to an open platform of the first application program.

The authorization response message is used to indicate that the permission object group identifier obtains the operation permission of the document. The authentication is performed by the second application program, so that the running burden of the first application program can be effectively shared, and the running speed of the first application program can be improved.

Operation S306: The open platform of the first application program sends the authorization response message to the second application program.

Operation S307: The second application program adds a plurality of authorization object identifiers to the permission object group when receiving the authorization response message sent by the open platform of the first application program.

When receiving the authorization response message sent by the open platform of the first application program, the second application program may add the plurality of authorization object identifiers to the permission object group and configure at least one operation permission for any one of the authorization object identifiers in the permission object group, so that each authorization device identifier in the permission object group possesses the operation permission of the document.

As shown in FIG. 3, through the collaboration of the second application program, the open background of the first application program, and the permission background of the first application program, the first application program opens the operation permission of the document to the permission object group, and the second application program adds the plurality of authorization object identifiers to the permission object group, to open the operation permission of the document to the plurality of authorization object identifiers.

(3) Authentication Stage

Figure 4:
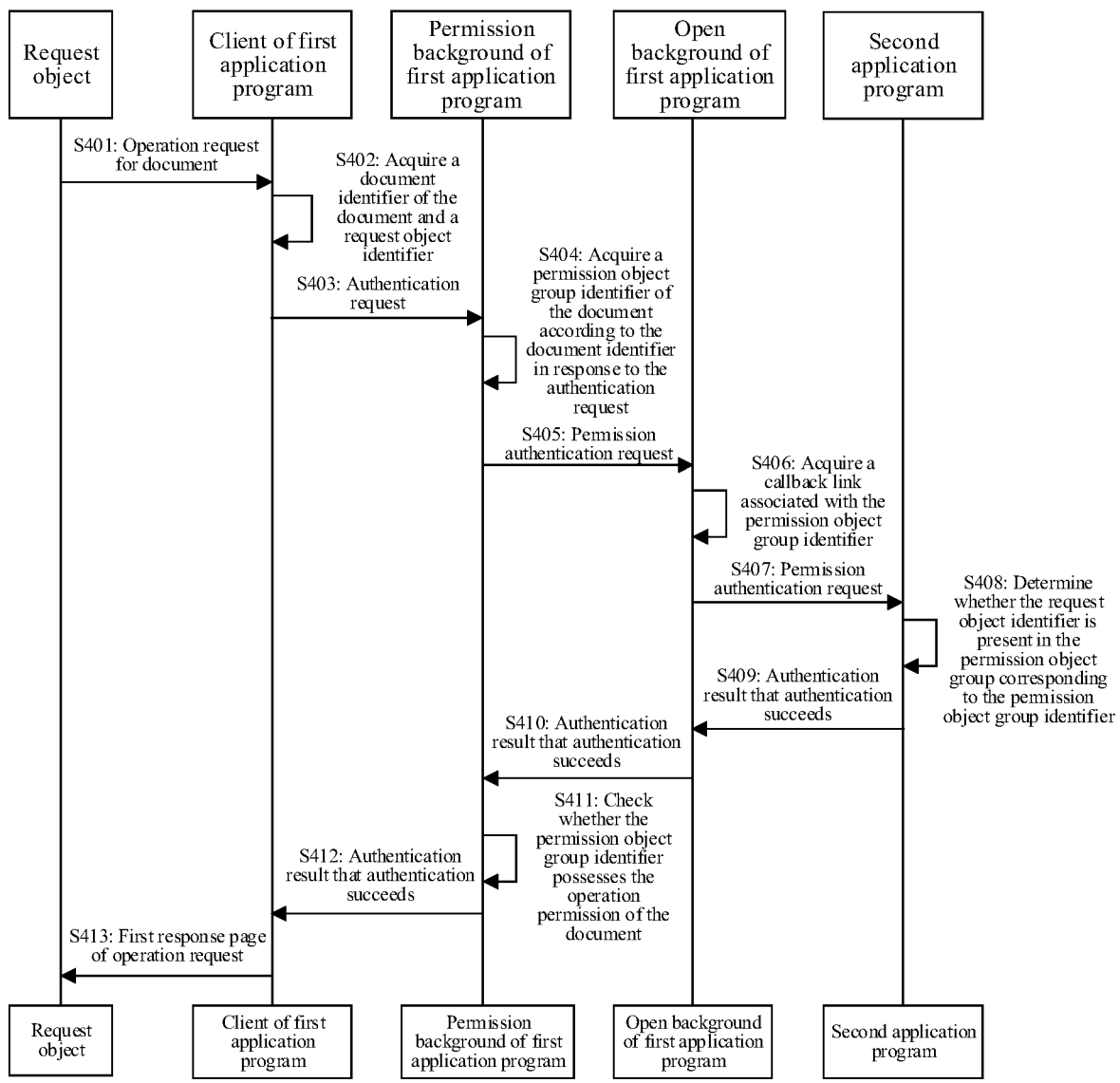
FIG. 4 is a schematic flowchart of an authentication stage according to some embodiments.

FIG. 4 is a schematic flowchart of an authentication stage according to some embodiments. After the permission object group creation stage and the permission object group binding stage are completed, the authentication stage can be applied. As shown in FIG. 4, the authentication stage includes the following operations S401 to S413:

Operation S401: A request object initiates an operation request for a document.

For example, the operation request includes, but is not limited to, a viewing request, an editing request, or the like. For example, the request object initiates a viewing request for a document through a document entry in a client of the first application program (which may be, for example, a web application program, a mobile or desktop application program, or a mini program), and initiates an editing request for the document through an editing option in the client of the first application program. Alternatively, the request object may initiate a viewing request for the document through a document entry in a client of the second application program.

Operation S402: The client of the first application program responds to the operation request for the document in the first application program to acquire a document identifier of the document and a request object identifier.

Operation S403: The client of the first application program sends an authentication request to the permission background of the first application program.

The authentication request may carry the document identifier and the request object identifier.

Operation S404: The permission background of the first application program acquires a permission object group identifier of the document according to the document identifier based on the authentication request.

Operation S405: The permission background of the first application program sends a permission authentication request to the open background of the first application program.

The permission authentication request may carry the permission object group identifier and the request object identifier.

Operation S406: The open background of the first application program acquires a callback link associated with the permission object group identifier.

Operation S407: The open background of the first application program calls the callback link and sends the permission authentication request for the request object identifier to the second application program.

Operation S408: The second application program determines whether the request object identifier is present in the permission object group corresponding to the permission object group identifier after receiving the permission authentication request.

For example, the permission authentication request may further carry a signature of the first application program or a digital certificate of the first application program. After the second application program receives the permission authentication request, the second application program may verify whether the signature of the first application program or the digital certificate of the first application program is present in the permission authentication request. When the signature of the first application program or the digital certificate of the first application program is present, the second application program may verify whether the signature of the first application program or the digital certificate of the first application program is correct. When the signature of the first application program or the digital certificate of the first application program is correct, the second application program further determines whether the request object identifier is present in the permission object group corresponding to the permission object group identifier. When neither signature of the first application program nor the digital certificate of the first application program is present in the permission authentication request, or the signature of the first application program or the digital certificate of the first application program is incorrect, the second application program determines that the permission authentication request is incorrect, and the second application program stops further authentication on the permission authentication request. In this manner, the accuracy of authentication may be improved.

Operation S409: The second application program sends an authentication result that the authentication succeeds to the open background of the first application program when the request object identifier is present in the permission object group corresponding to the permission object group identifier.

The authentication result that the authentication succeeds may carry a type of operation permission possessed by the request object identifier.

Operation S410: The open background of the first application program sends the authentication result that the authentication succeeds to the permission background of the first application program.

Operation S411: The permission background of the first application program checks whether the permission object group identifier possesses the operation permission of the document.

Operation S412: The permission background of the first application program sends the authentication result that the authentication succeeds to the client of the first application program when the permission object group identifier possesses the operation permission of the document.

In Operation S411 and Operation S412, the permission background of the first application program may check whether the permission object group identifier possesses the operation permission of the document. For example, the permission background of the first application program may further check whether the permission object group identifier possesses the same type of operation permission as the request object identifier. When the permission object group identifier possesses the operation permission of the document, and the type of operation permission of the permission object group identifier is the same as that of the request object identifier, the permission background of the first application program sends the authentication result that the authentication succeeds to the client of the first application program.

Operation S413: The client of the first application program outputs a first response page of the operation request to the request object according to the authentication result that the authentication succeeds.

For example, the client of the first application program may output a first response page to the request object and display the document in the first response page according to the authentication result that the authentication succeeds. When the type of operation permission possessed by the request object identifier carried by the authentication result that the authentication succeeds is an editing permission, the client of the first application program may perform an editing operation on the document according to the editing request.

As shown in FIG. 4, through the collaboration of the second application program, the open background of the first application program, the permission background of the first application program, and the client of the first application program, the authentication of the request object that initiates the operation request for the document is completed, and the situation that the authentication succeeds is described.

Figure 5:
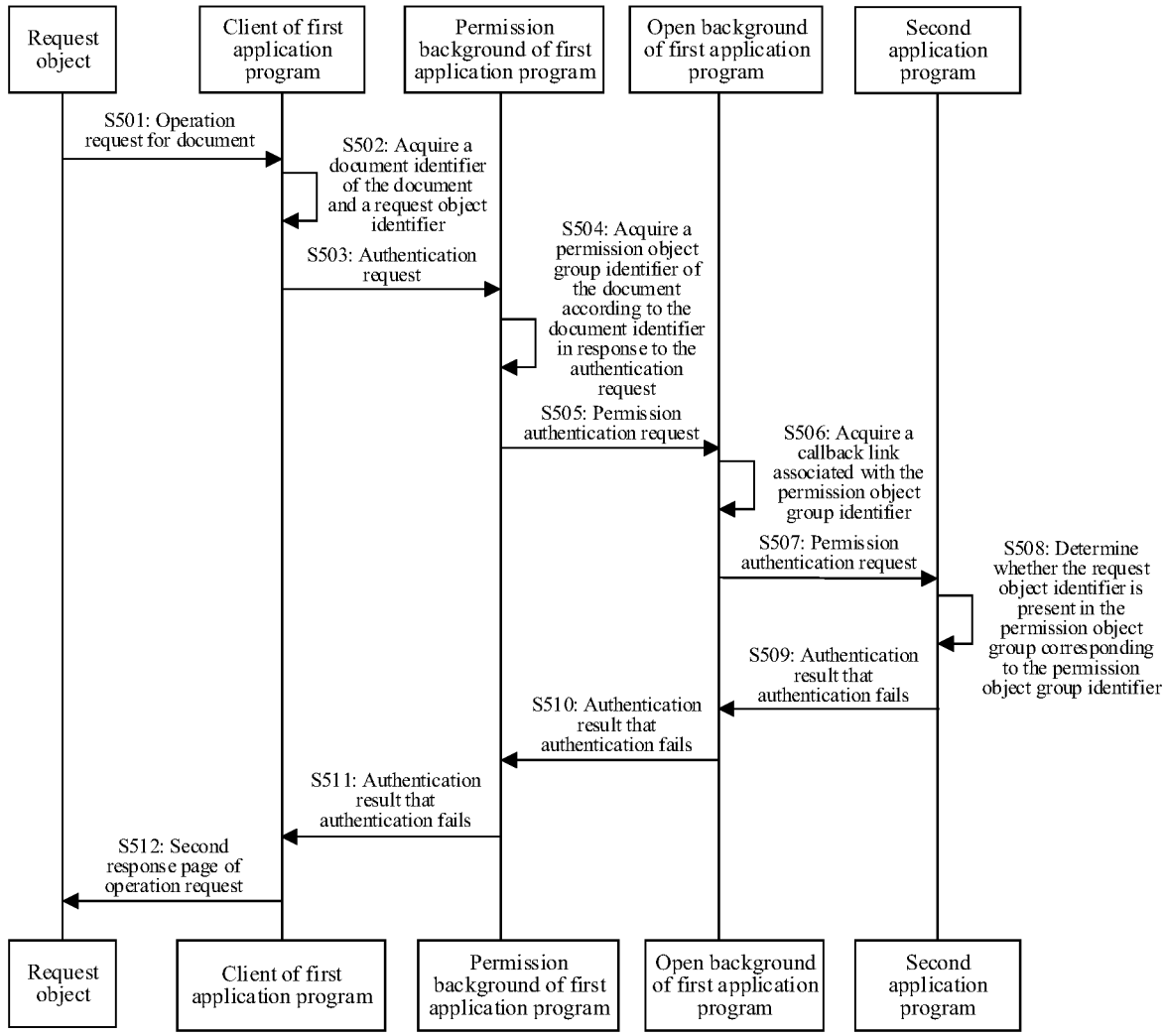
FIG. 5 is a schematic flowchart of an authentication stage according to some embodiments.

FIG. 5 is a schematic flowchart of an authentication stage according to some embodiments. As shown in FIG. 5, the authentication stage includes the following operations S501 to S512:

Operation S501: A request object initiates an operation request for a document.

Operation S502: The client of the first application program acquires, when detecting the operation request initiated for the document in the first application program, a document identifier of the document and a request object identifier.

Operation S503: The client of the first application program sends an authentication request to the permission background of the first application program.

Operation S504: The permission background of the first application program acquires a permission object group identifier of the document according to the document identifier based on the authentication request.

Operation S505: The permission background of the first application program sends a permission authentication request for the request object identifier to the open background of the first application program.

Operation S506: The open background of the first application program acquires a callback link associated with the permission object group identifier.

Operation S507: The open background of the first application program calls the callback link and sends the permission authentication request to the second application program.

Operation S508: The second application program determines whether the request object identifier is present in the permission object group corresponding to the permission object group identifier after receiving the permission authentication request.

A specific process of performing operations S501 to S508 in some embodiments shown in FIG. 5 may refer to the description of the embodiment shown in FIG. 4. Details are not described herein again.

Operation S509: The second application program sends an authentication result that the authentication fails to the open background of the first application program when the request object identifier is not present in the permission object group corresponding to the permission object group identifier.

Operation S510: The open background of the first application program sends the authentication result that the authentication fails to the permission background of the first application program.

Operation S511: The permission background of the first application program sends the authentication result that the authentication fails to the client of the first application program.

Operation S512: The client of the first application program outputs a second response page of the operation request to the request object according to the authentication result that the authentication fails.

For example, the client of the first application program may output the second response page to the request object according to the authentication result that the authentication fails and guide the request object to apply for the operation permission of the document in the second response page.

As shown in FIG. 5, through the collaboration of the second application program, the open background of the first application program, the permission background of the first application program, and the client of the first application program, the authentication of the request object that initiates the operation request for the document is completed, and the situation that the authentication fails is described.

In some embodiments, in the permission object group creation stage and the permission object group binding stage, for the first application program, the first application program eliminates the trouble of adding the first-type collaboration object of the document one by one, and only needs to add the permission object group identifier of the permission object group of the document, which reduces the cost and burden of the first application program in managing the plurality of collaboration objects in the second application program, and improves the document data processing efficiency of the first application program. For the second application program, the second application program creates the permission object group and maintains and manages the authorization object identifier in the permission object group. The first application program cannot know the authorization object identifier in the permission object group and the type of operation permission possessed by each authorization object identifier. In this way, the object information in the permission object group can be effectively protected, the privacy protection needs of the object information in the permission object group can be satisfied, and access of the second application program to the first application program can be facilitated. In the authentication stage, the first application program may send the permission authentication request to the second application program through the callback link, to request the second application program to authenticate the request object identifier carried by the permission authentication request by using the permission object group created by the second application program, thereby reducing the maintenance cost of the first application program.

Figure 6:
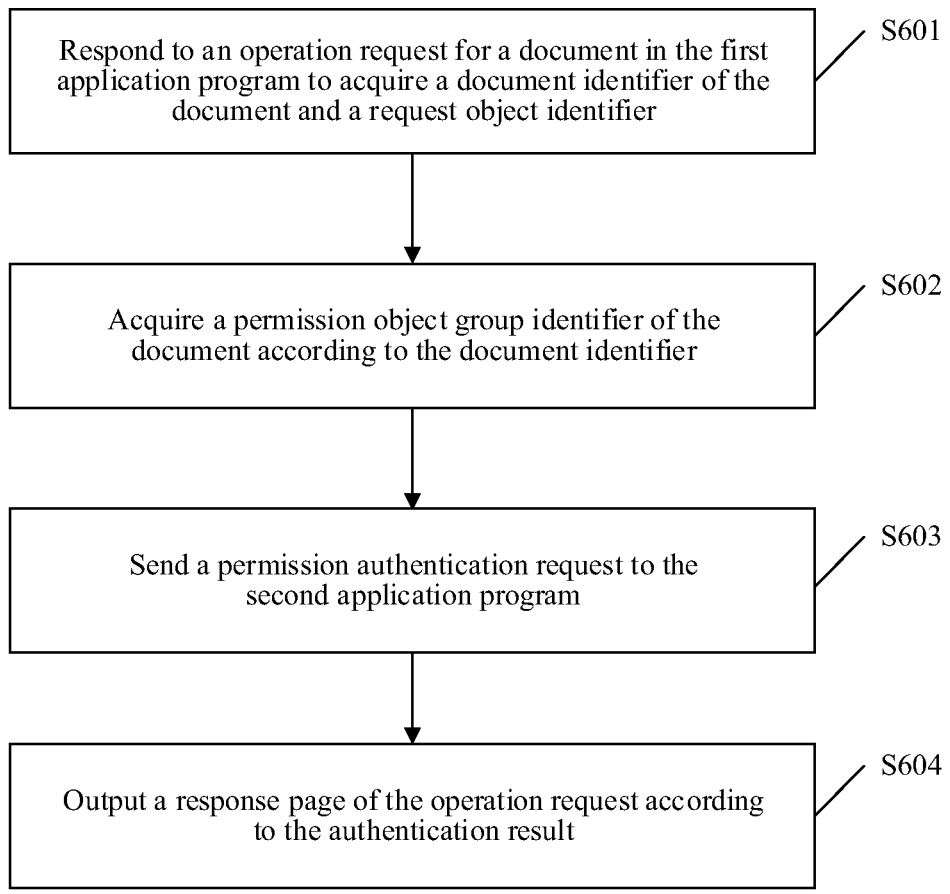
FIG. 6 is a schematic flowchart of a data transmission method according to some embodiments.

Refer to FIG. 6 based on the foregoing description. FIG. 6 is a schematic flowchart of a data transmission method according to some embodiments. The data transmission method may be performed by a first application program, and the data transmission method may include the following operations S601 to S604.

Operation S601: Respond to an operation request for a document in the first application program to acquire a document identifier of the document and a request object identifier.

The operation request includes, but is not limited to, a viewing request, an editing request, or the like. For example, a request object may initiate a viewing request for a document through a document entry in a client of the first application program (which may be, for example, a web application program, a mobile or desktop application program, or a mini program), and initiates an editing request for the document through an editing option (such as a font option or a paragraph option) in the client of the first application program. Alternatively, the request object may initiate a viewing request for the document through a document entry in a client of a second application program. When the operation request initiated for the document in the first application program is detected, the document identifier of the document and the request object identifier may be acquired. Document data corresponds to the document. The first application program is run on a first terminal.

Operation S602: Acquire a permission object group identifier of the document according to the document identifier.

For example, after the document identifier of the document is acquired, a permission object group identifier of the document may be acquired according to the document identifier. The permission object group identifier may be used to represent a permission object group possessing an operation permission of the document. The permission object group is created by the second application program, and the permission object group includes a plurality of authorization object identifiers (authorized collaboration object identifiers).

The permission object group identifier is generated by the first application program for the permission object group created by the second application program (running on the first terminal or a second terminal). The process of generating the permission object group identifier by the first application program for the permission object group may include: receiving a permission object group creation request sent by the second application program, the permission object group creation request including the document identifier and an application program identifier of the second application program; and generating the permission object group identifier for the permission object group according to the permission object group creation request, and returning the permission object group identifier to the second application program.

After the permission object group identifier is returned to the second application program, the first application program may receive an authorization request sent by the second application program, and open the operation permission of the document to the permission object group identifier based on the received authorization request. The authorization request includes the permission object group identifier, the application program identifier of the second application program, the document identifier (which may be a document ID or a document link, for example), a type of operation permission, and the like. The process in which the first application program opens the operation permission of the document to the permission object group identifier may include: performing correctness verification on the authorization request, where the correctness verification may refer to verifying whether the content included in the authorization request is correct and credible, for example, verifying whether the format of the document identifier is a standard document identifier format specified by the first application program, or verifying whether the permission object group identifier, the application program identifier of the second application program, and the document identifier included in the authorization request are the same as the permission object group identifier, the application program identifier of the second application program, and the document identifier stored in the first application program in an associated manner; adding, in a case that the correctness verification passes, the permission object group identifier to the document collaboration object list of the document, configuring the operation permission requested in the authorization request for the permission object group identifier, and sending an authorization response message to the second application program, the authorization response message being used to indicate that the permission object group identifier obtains the operation permission of the document.

The document collaboration object list may include a plurality of collaboration object identifiers of the document and the type of operation permission of the document possessed by each collaboration object identifier. Each collaboration object identifier in the document collaboration object list possesses the operation permission of the document. The collaboration object identifier may include the first-type collaboration object identifier or the permission object group identifier (that is, the second-type collaboration object identifier). Using the document collaboration object list can implement effective management of the document permission and improve the security of document data. Table 1 shows a document collaboration object list provided in some embodiments. As shown in Table 1, the document collaboration object list includes a first-type collaboration object identifier 1, a first-type collaboration object identifier 2, a permission object group identifier 1, and a permission object group identifier 2. The first-type collaboration object identifier 1 possesses a viewing permission of the document, the first-type collaboration object identifier 2 possesses an editing permission of the document, the permission object group identifier 1 possesses an editing permission of the document, and the permission object group identifier 2 possesses a viewing permission of the document.

TABLE 1

| Collaboration object identifier | Type of operation permission |
| --- | --- |
| First-type collaboration object identifier 1 | Viewing permission |
| First-type collaboration object identifier 2 | Editing permission |
| Permission object group identifier 1 | Editing permission |
| Permission group and collaboration group identifier 2 | Viewing permission |

Operation S603: Send a permission authentication request to the second application program, the permission authentication request being used to trigger the second application program to perform authentication processing on the request object identifier according to the permission object group identifier and return an authentication result.

For example, after the permission object group identifier and the request object identifier are acquired, the permission authentication request may be sent to the second application program. The permission authentication request is used to trigger the second application program to authenticate the request object identifier according to the permission object group identifier and return an authentication result, and the permission authentication request includes the permission object group identifier and the request object identifier. The manner of sending the permission authentication request to the second application program by the first application program includes, but is not limited to, the following two manners: The application program identifier of the second application program and a callback link are stored in the first application program in an associated manner. The callback link may be used to access the second application program, and for example, the callback link may be an access address of the second application program. The callback link may be called to send the permission authentication request to the second application program. In this manner, the first application program may request the second application program to perform authentication by calling the callback link. Through the callback link, the second application program can quickly access the first application program, and a delay in the connection of the second application program to the first application program can be avoided, thereby improving the efficiency of document data transmission. Alternatively, a communication connection between the first application program and the second application program may be established through a document authentication transmission protocol; and the permission authentication request may be encapsulated into a permission authentication data packet, and the permission authentication data packet may be sent to the second application program based on the document authentication transmission protocol. In this manner, when the permission authentication data packet conforms to the specification of the document authentication transmission protocol, the first application program may request the second application program to perform the authentication, thereby improving the speed at which the first application program sends the permission authentication request to the second application program, improving the transmission efficiency of the permission authentication request, and thus improving the efficiency of authenticating the request object.

Operation S604: Output a response page of the operation request according to the authentication result returned from the second application program.

Figure 7A:
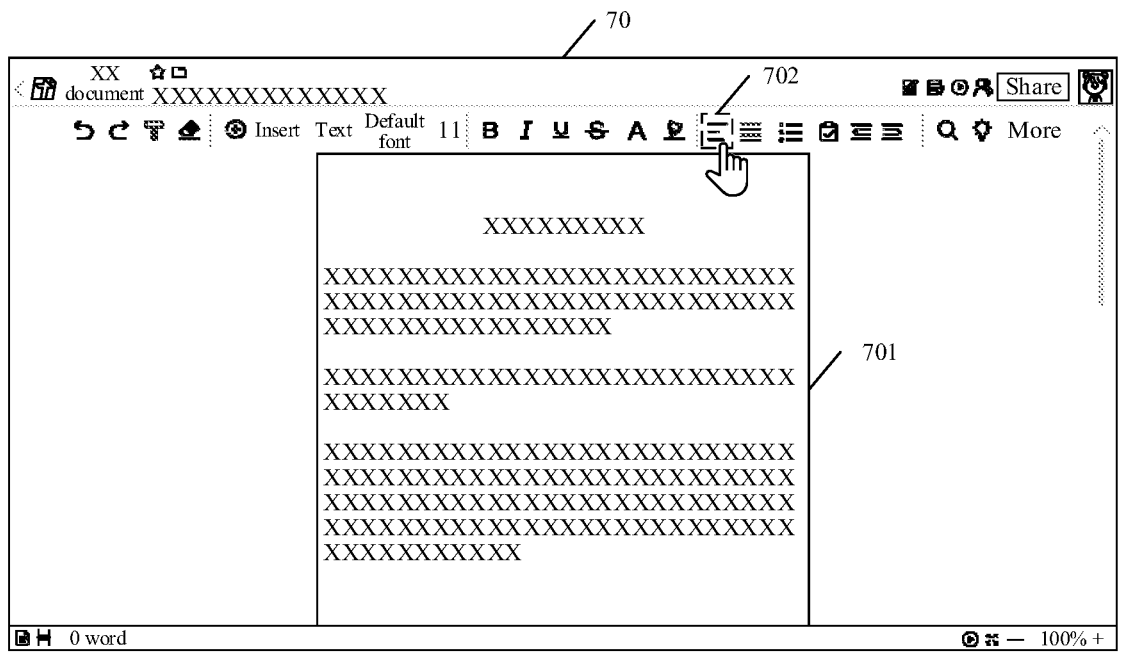
FIG. 7A is a schematic diagram of a response page according to some embodiments.

For example, the operation request includes, but is not limited to, a viewing request or an editing request. The operation permission may include, but is not limited to, a viewing permission of an editing permission. When the authentication result is that the authentication succeeds, the authentication result carries the type of operation permission possessed by the request object identifier. When the authentication result is that the authentication succeeds, the first response page may be outputted and the document may be displayed in the first response page according to the authentication result that the authentication succeeds. When the type of operation permission possessed by the request object identifier carried by the authentication result is an editing permission, an editing operation may be performed on the document according to the editing request. Therefore, through the authentication operation, it can be ensured that only the object processing the permission can operate the document, so that a safe document editing operation is implemented, thereby improving the information security and ensuring the security of document data transmission. FIG. 7A is a schematic diagram of a response page according to some embodiments. As shown in FIG. 7A, when the authentication result is that the authentication succeeds, a first response page 70 may be outputted, and a document 701 is displayed in the first response page 70. When the type of operation permission possessed by the request object identifier carried by the authentication result is the editing permission, an editing operation may be performed on the document according to the editing request. For example, when the editing request indicates the request object to click a left alignment option 702 in the first response page, the content in the document may be adjusted to align to the left according to the editing request.

Figure 7B:
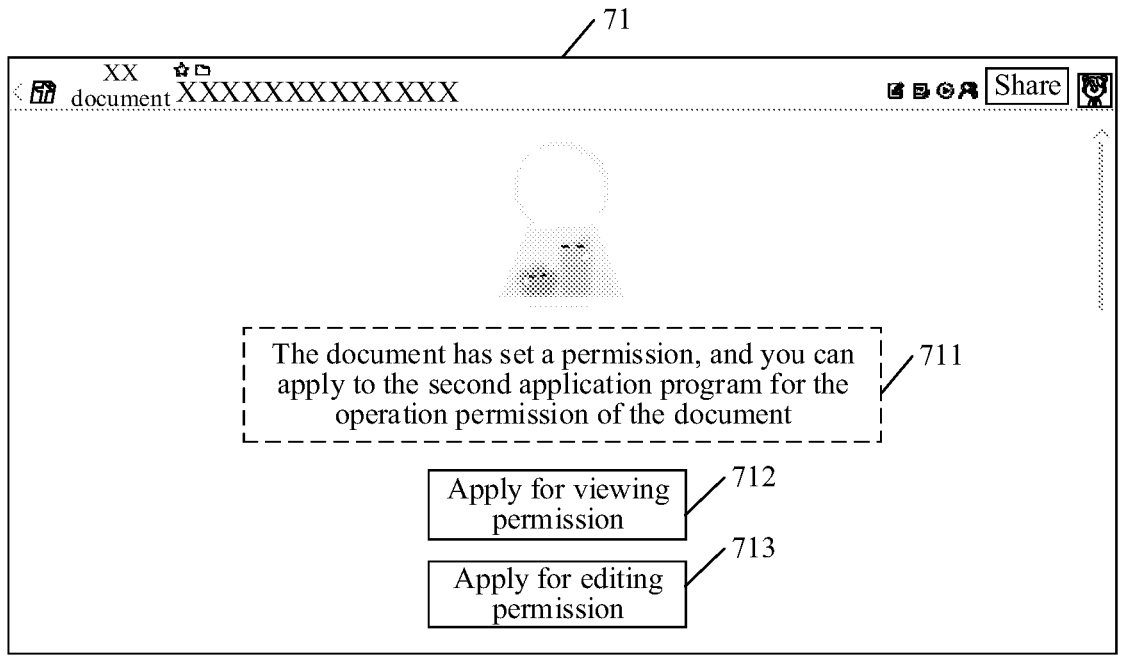
FIG. 7B is a schematic diagram of a response page according to some embodiments.

When the authentication result is that the authentication fails, a second response page may be outputted according to the authentication result that the authentication fails, where the second response page may include an authentication failure prompt message and a permission application option. When the permission application option is selected, the operation permission of the document may be opened to the request object identifier. The permission application option may include a viewing permission application option or an editing permission application option. When the viewing permission application option is selected, the viewing permission of the document may be opened to the request object identifier. When the editing permission application option is selected, the editing permission of the document may be opened to the request object identifier. Therefore, the document processing by the object without permission can be avoided through the authentication operation, thereby improving the security of the document data processing. FIG. 7B is a schematic diagram of a response page according to some embodiments. As shown in FIG. 7B, when the authentication result is that the authentication fails, a second response page 71 may be outputted. The second response page 71 may include an authentication failure prompt message 711 (for example, the authentication failure prompt message that "The document has set a permission, and you can apply to the second application program for the operation permission of the document" in FIG. 7B). The second response page 71 may further include a viewing permission application option 712 (for example, option of "Apply for viewing permission" in FIG. 7B) and an editing permission application option 713 (for example, option of "Apply for editing permission" in FIG. 7B).

For example, opening the operation permission of the document to the request object identifier may include two cases: In an implementation, when the permission application option is selected, the request object identifier may be set to the first-type collaboration object identifier, that is, the request object identifier is added to the document collaboration object list of the document, and the operation permission of the document is configured for the request object identifier. For example, when the viewing permission application option is selected, the request object identifier is added to the document collaboration object list of the document, and the viewing permission of the document is configured for the request object identifier. Alternatively, when the editing permission application option is selected, the request object identifier is added to the document collaboration object list of the document, and the editing permission of the document is configured for the request object identifier. In this way, when the authentication fails, the request object may apply to become the first-type collaboration object of the document to satisfy the document processing needs of the object. In another implementation, when the permission application option is selected, the permission application request may be sent to the second application program. The permission application request may be used to trigger the second application program to add the request object identifier to the permission object group and configure the operation permission of the document for the request object identifier. The permission application request may include a viewing permission application request and an editing permission application request. For example, when the viewing permission application option is selected, the viewing permission application request may be sent to the second application program. The viewing permission application request may be used to trigger the second application program to add the request object identifier to the permission object group and configure the viewing permission of the document for the request object identifier. Alternatively, when the editing permission application option is selected, the editing permission application request may be sent to the second application program. The editing permission application request may be used to trigger the second application program to add the request object identifier to the permission object group and configure the editing permission of the document for the request object identifier. In this way, when the authentication fails, the request object may apply to become a member of the second-type collaboration object of the document, so that the permission of processing the document can be reasonably generated for the object based on the permission application, thereby improving the information security.

In some embodiments, when the operation request initiated for the document in the first application program is detected, the document identifier of the document and the request object identifier are acquired. If the permission object group identifier is present in the document, the first application program requests the second application program to authenticate the request object identifier according to the permission object group identifier. Therefore, while ensuring accurate authentication, the authentication cost of the first application program is effectively reduced, and the object information in the permission object group of the second application program is effectively protected. In a case that the authentication fails, the request object may apply to be a member of the first-type collaboration object of the document or a member of the second-type collaboration object of the document, to satisfy the usage needs of the document object.

Figure 8:
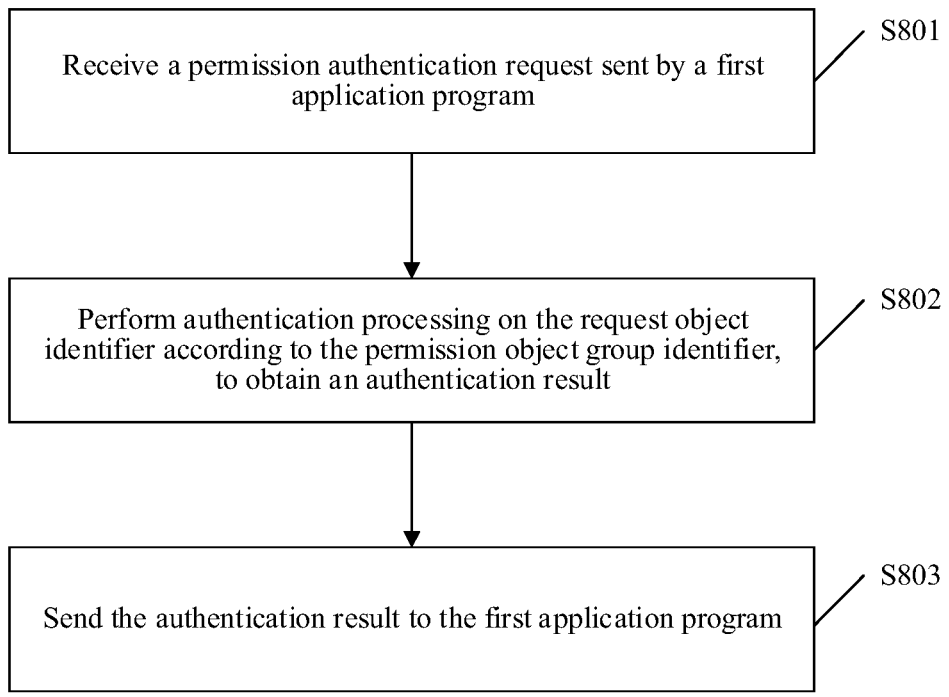
FIG. 8 is a schematic flowchart of a data transmission method according to some embodiments.

FIG. 8 is a schematic flowchart of a data transmission method according to some embodiments. The data transmission method may be performed by a second application program, and the data transmission method may include the following operations S801 to S803.

Operation S801: Receive a permission authentication request sent by a first application program, the permission authentication request including a permission object group identifier and a request object identifier.

The permission authentication request is sent after the first application program responds to an operation request initiated for a document in the first application program to acquire a document identifier of the document and the request object identifier, and acquires the permission object group identifier according to the document identifier. The permission object group identifier is used to represent a permission object group possessing an operation permission of the document, and the permission object group is created by the second application program.

The process of creating the permission object group by the second application program may include: sending a permission object group creation request to the first application program, the permission object group creation request carrying the document identifier and an application program identifier of the second application program; receiving the permission object group identifier sent by the first application program, the permission object group identifier being generated by the first application program according to the permission object group creation request; creating the permission object group according to the permission object group identifier; and adding a plurality of authorization object identifiers to the permission object group, and configuring at least one operation permission for any one of the authorization object identifiers in the permission object group. In an implementation, if the first application program configures a type of operation permission of the document for the permission object group identifier, such as a viewing permission of the document, each authorization device identifier in the permission object group corresponding to the permission object group identifier possesses the viewing permission of the document. Table 2 shows a table structure of a permission object group provided in some embodiments. As shown in Table 2, the permission object group includes three authorization object identifiers. The first application program configures the viewing permission of the document for the permission object group identifier, and accordingly, each authorization device identifier in the permission object group corresponding to the permission object group identifier possesses the viewing permission of the document. In this way, each authorization object identifier in the permission object group has the same operation permission type of the document in the first application program, making it easier for the second application program to manage the permission object group. In another implementation, when the first application program configures one or more types of operation permission of the document for the permission object group identifier, such as the viewing permission of the document, the editing permission of the document, and a sharing permission of the document, each authorization device identifier in the permission object group corresponding to the permission object group identifier may possess at least one operation permission of the document, which may be, for example, any one or more of the viewing permission of the document, the editing permission of the document, and the sharing permission of the document. Table 3 shows a table structure of a permission object group provided in some embodiments. As shown in Table 3, the permission object group includes three authorization object identifiers. The first application program configures the editing permission of the document and the sharing permission of the document for the permission object group identifier, and each authorization device identifier in the permission object group corresponding to the permission object group identifier may possess any one or both of the editing permission of the document and the sharing permission of the document. For example, in Table 3, an authorization object identifier 1 possesses the editing permission of the document, an authorization object identifier 2 possesses the editing permission of the document and the sharing permission of the document, and an authorization object identifier 3 possesses the sharing permission of the document. In this way, the authorization object identifier in the permission object group possesses at least one type of operation permission of the document in the first application program, which enriches the management manner of the permission object group in the second application program, and better meets the document processing needs of the document object.

TABLE 2

| Authorization object identifier | Type of operation permission |
| --- | --- |
| Authorization object identifier 1 | Viewing permission |
| Authorization object identifier 2 | Viewing permission |
| Authorization object identifier 3 | Viewing permission |

TABLE 3

| Authorization object identifier | Type of operation permission |
| --- | --- |
| Authorization object identifier 1 | Editing permission |
| Authorization object identifier 2 | Editing permission and sharing permission |
| Authorization object identifier 3 | Sharing permission |

Operation S802: Perform authentication processing on the request object identifier according to the permission object group identifier, to obtain an authentication result.

The permission object group includes a plurality of authorization object identifiers, and each authorization object identifier in the permission object group possesses at least one operation permission of the document. The authentication of the request object identifier according to the permission object group identifier may include: verifying whether the request object identifier is present in the permission object group; if so, generating an authentication result that the authentication succeeds, acquiring a type of operation permission possessed by the request object identifier, and adding the type of operation permission possessed by the request object identifier to the authentication result; and otherwise, generating the authentication result that the authentication fails. In this way, through the authentication operation, a secure document editing operation is performed to improve the information security.

Operation S803: Send the authentication result to the first application program.

After the request object identifier is authenticated according to the permission object group identifier, the authentication result is returned to the first application program.

In a case that the authentication fails, a permission application request sent by the first application program may be further received, the permission application request being sent by the first application program in a case that the authentication result is that the authentication fails, and the permission application request including the request object identifier. Based on the permission application request, the request object identifier may be verified, to determine whether the request object identifier belongs to the second application program. If the request object identifier belongs to the second application program, the request object identifier is added to the permission object group, and at least one operation permission is configured for the request object identifier. The permission application request may include a viewing permission application request and an editing permission application request. When the permission application request is the viewing permission application request, based on the viewing permission application request, the request object identifier may be added to the permission object group, and the viewing permission may be configured for the request object identifier. When the permission application request is the editing permission application request, based on the editing permission application request, the request object identifier may be added to the permission object group, and the editing permission may be configured for the request object identifier.

In some embodiments, when the permission authentication request sent by the first application program is received, the request object identifier carried by the permission authentication request may be authenticated according to the permission object group identifier carried by the permission authentication request. If the request object identifier is present in the permission object group corresponding to the permission object group identifier, the authentication result that the authentication succeeds is generated. If the request object identifier is not present in the permission object group corresponding to the permission object group identifier, the authentication result that the authentication fails is generated. And, the authentication result is returned to the first application program. It can be seen from the foregoing solutions that, the second application program maintains and manages the permission object group, which can satisfy the need of privacy protection for the information of each object in the permission object group. In addition, in a case that the authentication fails, the second application program may set the request object identifier as a member of the permission object group, so that the request object identifier possesses the operation permission of the document, and the document usage needs of the request object is satisfied.

Figure 9:
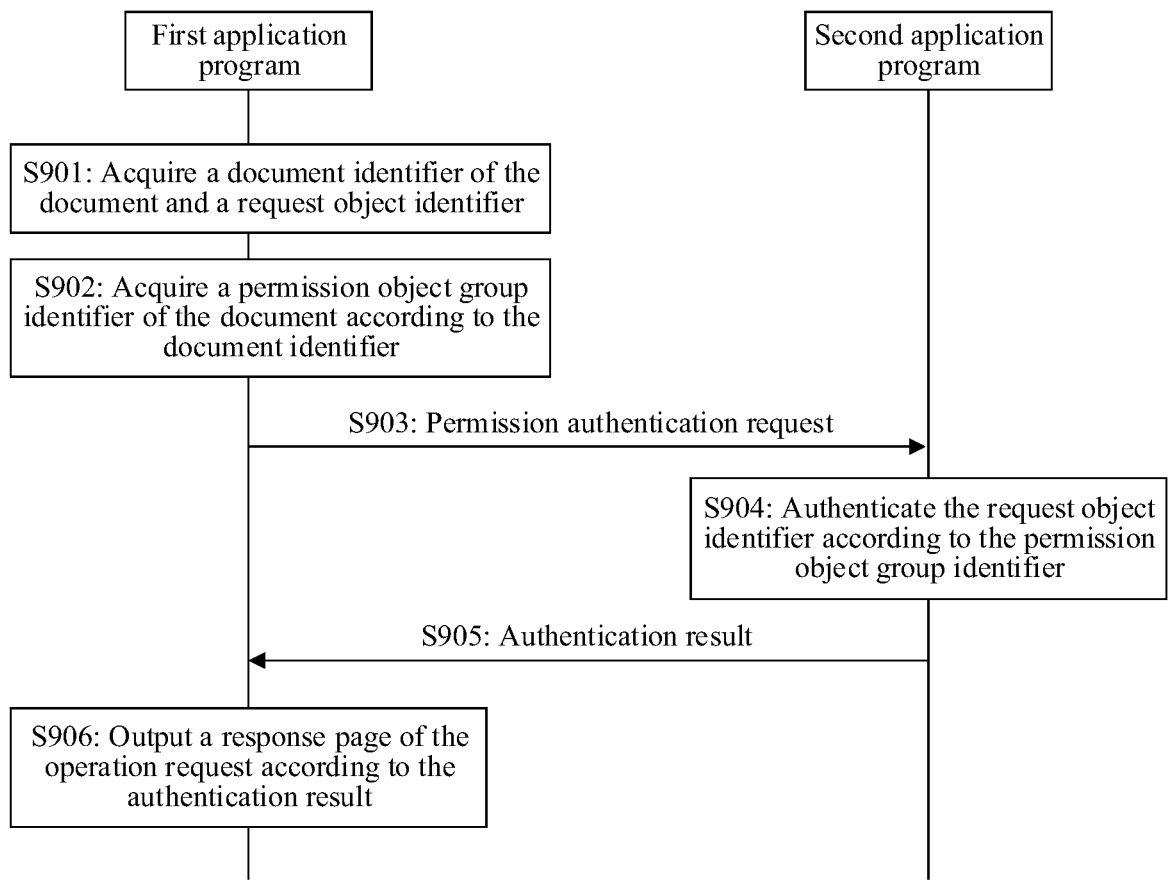
FIG. 9 is a schematic flowchart of a data transmission method according to some embodiments.

FIG. 9 is a schematic flowchart of a data transmission method according to some embodiments. The data transmission method may be interactively performed by a first application program and a second application program, and the data transmission method may include the following operations S901 to S906.

Operation S901: Responding to an operation request for a document in the first application program, the first application program acquires a document identifier of the document and a request object identifier.

For example, the operation request includes, but is not limited to, a viewing request, an editing request, or the like. For example, a request object may initiate a viewing request for a document through a document entry in a client of the first application program (which may be, for example, a web application program, a mobile or desktop application program, or a mini program), and initiates an editing request for the document through an editing option (such as a font option or a paragraph option) in the client of the first application program. Alternatively, the request object may initiate a viewing request for the document through a document entry in a client of the second application program. When the operation request initiated for the document in the first application program is detected, the first application program may acquire the document identifier of the document and the request object identifier.

Operation S902: The first application program acquires a permission object group identifier of the document according to the document identifier.

After acquiring the document identifier, the first application program may acquire the permission object group identifier. The permission object group identifier may be used to represent a permission object group possessing the operation permission of the document, and the permission object group is created by the second application program.

Operation S903: The first application program sends a permission authentication request to the second application program, the permission authentication request including the permission object group identifier and the request object identifier.

After the permission object group identifier and the request object identifier are acquired, the first application program may send the permission authentication request to the second application program. The permission authentication request is used to trigger the second application program to authenticate the request object identifier according to the permission object group identifier and return an authentication result.

Operation S904: The second application program performs authentication processing on the request object identifier according to the permission object group identifier, to obtain an authentication result.

For example, the permission object group includes a plurality of authorization object identifiers, and each authorization object identifier in the permission object group possesses at least one operation permission of the document. That the second application program performs authentication processing on the request object identifier according to the permission object group identifier may include: verifying whether the request object identifier is present in the permission object group; generating, in a case that the request object identifier is present in the permission object group, an authentication result that the authentication succeeds, acquiring a type of operation permission possessed by the request object identifier, and adding the type of operation permission possessed by the request object identifier to the authentication result; and generating an authentication result that the authentication fails in a case that the request object identifier is not present in the permission object group.

Operation S905: The second application program sends the authentication result to the first application program.

After performing the authentication processing on the request object identifier according to the permission object group identifier, the second application program may return the authentication result to the first application program.

Operation S906: The first application program outputs a response page of the operation request according to the authentication result.

For example, the operation request includes, but is not limited to, a viewing request or an editing request. The operation permission includes, but is not limited to, a viewing permission of an editing permission. When the authentication result is that the authentication succeeds, the authentication result carries the type of operation permission possessed by the request object identifier. When the authentication result is that the authentication succeeds, the first response page may be outputted and the document may be displayed in the first response page according to the authentication result that the authentication succeeds. When the type of operation permission possessed by the request object identifier carried by the authentication result is the editing permission, an editing operation may be performed on the document according to the editing request. When the authentication result is that the authentication fails, a second response page may be outputted according to the authentication result that the authentication fails, where the second response page may include an authentication failure prompt message and a permission application option. When the permission application option is selected, the operation permission of the document may be opened to the request object identifier.

Before the first application program acquires the permission object group identifier of the document according to the document identifier, the first application program may first verify whether the request object identifier is the first-type collaboration object identifier of the document, that is, verify whether the request object identifier is present in a document collaboration object list of the document. When it is verified that the request object identifier is present in the document collaboration object list of the document, the first application program determines that the authentication succeeds, and the first application program may output the first response page according to the authentication result that the authentication succeeds. When the request object identifier possesses the viewing permission of the document, the first application program may display the document in the first response page. When the request object identifier possesses the editing permission of the document, the first application program may display the document in the first response page, and the editing operation may be performed on the document according to the editing request. When it is verified that the request object identifier is not present in the document collaboration object list of the document, the first application program may acquire the permission object group identifier of the document according to the document identifier, send the permission authentication request to the second application program, and request the second application program to authenticate the request object identifier. In this way, when the request object identifier is the first-type collaboration object identifier, the request object identifier may be directly authenticated by the first application program without requesting the second application program to authenticate, thereby improving the authentication efficiency of the first application program.

The operation request may be any one of operation requests initiated for the document in the first application program and detected by the first application program, that is, the first application program needs to authenticate the request object identifier of each detected operation request. In this way, the authentication accuracy may be improved. Alternatively, the operation request may be a first operation request initiated for the document in the first application program and detected by the first application program. When the authentication succeeds, the first application program may directly respond to other operation requests initiated by the same request object for the document. The other operation requests refer to operation requests whose request time is after the first operation request. In this way, the authentication efficiency can be improved. Alternatively, the operation request may be a first operation request initiated for the document in the first application program and detected by the first application program. When the authentication succeeds, the first application program may store the document identifier and the request object identifier in an associated manner. When other operation requests for the document initiated by the same request object are received, the first application program may not request the second application program to authenticate, but directly verify whether the request object identifier that initiates the other operation requests is the same as the request object identifier stored in the first application program in an associated manner. When the request object identifier that initiates the other operation requests is the same as the request object identifier stored in the first application program in an associated manner, it is determined that the authentication succeeds. The other operation requests refer to operation requests whose request time is after the first operation request. The first application program may further update the document identifier and the request object identifier stored in an associated manner every preset period of time. In this way, the authentication efficiency is improved while the accuracy of the appraisal is ensured.

In some embodiments, in a case that the request object identifier is present in the document collaboration object list of the document, that is, the request object identifier is the first-type collaboration object identifier of the document, the first application program may directly authenticate the request object identifier without requesting the second application program to authenticate, which improves the authentication efficiency of the first application program. In a case that the request object identifier is not present in the document collaboration object list of the document, and the permission object group identifier is present in the document collaboration object list, that is, the object corresponding to the request object identifier is a member of the second-type collaboration object of the document, the first application program may request the second application program to authenticate, which reduces the authentication cost of the first application program. The permission object group is created, managed, and maintained by the second application program, which effectively protects the information of each object in the permission object group from being exposed to the first application program.

The method in some embodiments is described in detail above. For ease of better implementing the foregoing solutions in some embodiments, an apparatus in some embodiments is provided in the following.

Figure 10:
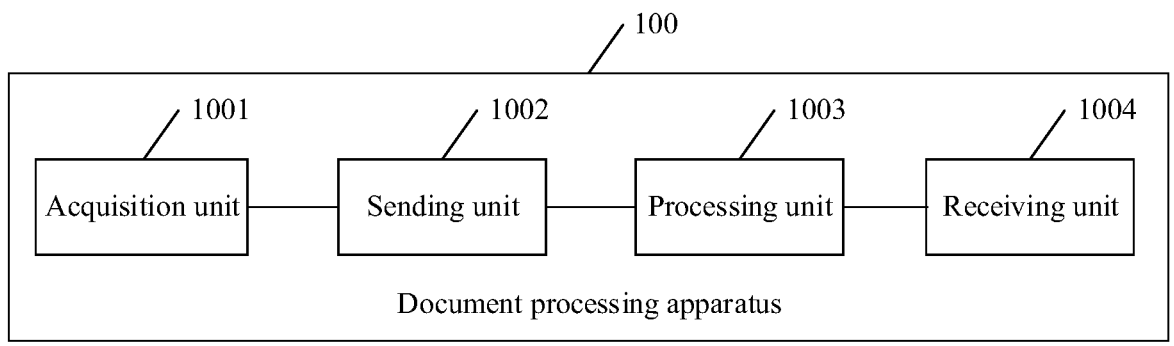
FIG. 10 is a schematic structural diagram of a data transmission apparatus according to some embodiments.

FIG. 10 is a schematic structural diagram of a data transmission apparatus according to some embodiments. The data transmission apparatus 100 may be set in a first application program, and may be configured to perform the corresponding operations of the first application program in the method embodiments shown in FIG. 2 to FIG. 9. The data transmission apparatus 100 may include the following units:

an acquisition unit, configured to run a first application program on the first terminal; and respond to an operation request for a document in the first application program to acquire a request object identifier and a document identifier of the document;

the acquisition unit 1001, further configured to acquire a permission object group identifier of the document according to the document identifier, the permission object group identifier being used to represent a permission object group possessing an operation permission of the document, the permission object group being created by a second application program, and the permission object group including a plurality of authorization object identifiers; a sending unit 1002, configured to send a permission authentication request for the request object identifier to the second application program, the permission authentication request being used to trigger the second application program to perform authentication processing on the request object identifier according to the permission object group identifier and return an authentication result, and the permission authentication request including the permission object group identifier and the request object identifier; and a processing unit 1003, configured to output a response page of the operation request according to the authentication result returned from the second application program.

In some embodiments, the data transmission apparatus 100 further includes a receiving unit 1004. The receiving unit 1004 is configured to receive a permission object group creation request sent by the second application program, the permission object group creation request including the document identifier and an application program identifier of the second application program. The processing unit 1003 is further configured to generate the permission object group identifier for the permission object group according to the permission object group creation request. The sending unit 1002 is further configured to send the permission object group identifier to the second application program. The receiving unit 1004 is further configured to receive an authorization request sent by the second application program, the authorization request including the permission object group identifier. The processing unit 1003 is further configured to open, based on the authorization request, the operation permission of the document to the permission object group corresponding to the permission object group identifier.

In some embodiments, the processing unit 1003 is further configured to: perform correctness verification on the authorization request; add the permission object group identifier to a document collaboration object list of the document in a case that the authorization request passes the correctness verification, the document collaboration object list including a plurality of collaboration object identifiers of the document, each collaboration object identifier in the document collaboration object list possessing the operation permission of the document, and the collaboration object identifier being used to identify a collaboration object; and send an authorization response message to the second application program, the authorization response message being used to indicate that the permission object group corresponding to the permission object group identifier obtains the operation permission of the document.

In some embodiments, the application program identifier of the second application program and a callback link are stored in the first application program in an associated manner, the callback link being used to access the second application program; and the sending unit 1002 is further configured to: call the callback link to send the permission authentication request to the second application program.

In some embodiments, a communication connection between the first application program and the second application program is established through a document authentication transmission protocol; and the sending unit 1002 is further configured to: encapsulate the permission authentication request into a permission authentication data packet, and send the permission authentication data packet to the second application program based on the document authentication transmission protocol.

In some embodiments, the operation request includes a viewing request or an editing request, and the operation permission includes a viewing permission or an editing permission. In a case that the authentication result is that the authentication succeeds, a first response page is outputted and the document is displayed in the first response page. The processing unit 1003 is further configured to: output a first response page and display the document in the first response page, in a case that the authentication result is that the authentication succeeds; and perform an editing operation on the document according to the editing request in a case that the type of operation permission possessed by the request object identifier included in the authentication result is the editing permission.

In some embodiments, the processing unit 1003 is further configured to: output a second response page, in a case that the authentication result is that the authentication fails, the second response page including an authentication failure prompt message and a permission application option; and open the operation permission of the document to the request object identifier based on a trigger operation for the permission application option.

According to some embodiments, the units of the data transmission apparatus 100 shown in FIG. 10 may be separately or wholly combined into one or several other units, or one (or more) of the units may be further divided into a plurality of units having smaller functions. In this way, same operations may be implemented without affecting the implementation of the technical effects of some embodiments. The foregoing units are divided based on logical functions. In an actual application, a function of one unit may be implemented by a plurality of units, or functions of a plurality of units may be implemented by one unit. In other embodiments, the data transmission apparatus 100 may also include other units. In an actual application, the functions may also be cooperatively implemented by other units and may be cooperatively implemented by a plurality of units. According to some embodiments, a computer program (including program code) that can perform the operations of the first application program in the corresponding method shown in FIG. 2 to FIG. 9 may be run on a general computing device including processing elements and storage elements such as a central processing unit (CPU), a random access memory (RAM), and a read-only memory (ROM), to construct the data transmission apparatus 100 shown in FIG. 10 and implement the data transmission method in some embodiments. The computer program may be recorded in, for example, a computer-readable storage medium, and may be loaded into the foregoing computing device by using the computer-readable storage medium, and run on the computing device.

In some embodiments, when an operation request initiated for a document in a first application program is detected, a document identifier of the document and a request object identifier are acquired. And, a permission object group identifier of the document is acquired according to the document identifier, the permission object group identifier being used to represent a permission object group possessing an operation permission of the document, and the permission object group being created by a second application program. A permission authentication request is sent to the second application program, the permission authentication request carrying the permission object group identifier and the request object identifier, and being used to trigger the second application program to perform authentication processing on the request object identifier according to the permission object group identifier and return an authentication result. A response page of the operation request is outputted according to the authentication result. It can be seen from the foregoing solutions that, first, by means of the permission object group, a permission object group can be added and set as the collaboration object of the document at a time, so that the setting efficiency of the collaboration object can be effectively improved. Moreover, the permission object group is created and managed by the second application program, and information of each object in the permission object group need not be exposed to the first application program, so that the need of privacy protection for the information of each object in the permission object group is satisfied. In addition, when the request object initiates an operation request for the document in the first application program, the second application program performs the authentication, so that the processing burden of the first application program can be effectively shared, and the maintenance cost can be reduced.

Figure 11:
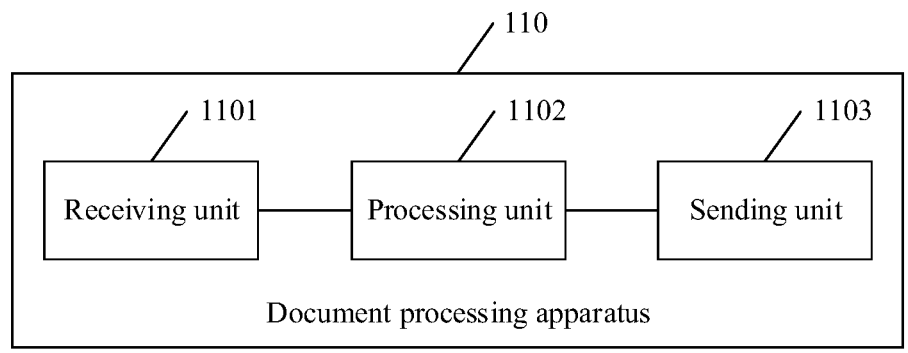
FIG. 11 is a schematic structural diagram of a data transmission apparatus according to some embodiments.

FIG. 11 is a schematic structural diagram of a data transmission apparatus according to some embodiments. The data transmission apparatus 110 may be set in a first application program, and may be configured to perform the corresponding operations of the second application program in the method embodiments shown in FIG. 2 to FIG. 9. The data transmission apparatus 110 may include the following units:

a receiving unit 1101, configured to receive a permission authentication request for a request object identifier sent by a first application program, the permission authentication request including a permission object group identifier and the request object identifier, where the first application program is run on the first terminal, and the first application program responds to an operation request of a document in the first application program to acquire the request object identifier and a document identifier of the document, and acquires a permission object group identifier of the document according to the document identifier, the permission object group identifier being used to represent a permission object group possessing an operation permission of the document, the permission object group being created by a second application program, and the permission object group including a plurality of authorization object identifiers; a processing unit 1102, configured to perform authentication processing on the request object identifier according to the permission object group identifier, to obtain an authentication result; and a sending unit 1103, configured to send the authentication result to the first application program.

In some embodiments, each authorization object identifier in the permission object group possesses at least one operation permission of the document; and the processing unit 1102 is further configured to: verify whether the request object identifier is present in the permission object group; generate, in a case that the request object identifier is present in the permission object group, an authentication result that the authentication succeeds, acquire a type of operation permission possessed by the request object identifier, and add the type of operation permission possessed by the request object identifier to the authentication result that the authentication succeeds; and generate an authentication result that the authentication fails in a case that the request object identifier is not present in the permission object group.

In some embodiments, the sending unit 1103 is further configured to send a permission object group creation request to the first application program, the permission object group creation request including the document identifier and an application program identifier of the second application program.

The receiving unit 1101 is further configured to receive the permission object group identifier sent by the first application program, the permission object group identifier being generated by the first application program according to the permission object group creation request. The processing unit 1102 is further configured to create the permission object group according to the permission object group identifier; and add the plurality of authorization object identifiers to the permission object group, and configure at least one operation permission for any one of the authorization object identifiers in the permission object group.

In some embodiments, the receiving unit 1101 is further configured to receive a permission application request sent by the first application program, the permission application request being sent by the first application program in a case that the authentication result is that the authentication fails, and the permission application request including the request object identifier. The processing unit 1102 is further configured to add, based on the permission application request, the request object identifier to the permission object group and configure at least one operation permission for the request object identifier.

According to some embodiments, the units of the data transmission apparatus 110 shown in FIG. 11 may be separately or wholly combined into one or several other units, or one (or more) of the units may be further divided into a plurality of units having smaller functions. In this way, same operations may be implemented without affecting the implementation of the technical effects of some embodiments. The foregoing units are divided based on logical functions. In an actual application, a function of one unit may be implemented by a plurality of units, or functions of a plurality of units may be implemented by one unit. In some embodiments, the data transmission apparatus 110 may also include other units. In an actual application, the functions may also be cooperatively implemented by other units and may be cooperatively implemented by a plurality of units. According to some embodiments, a computer program (including program code) that can perform the operations of the second application program in the corresponding method shown in FIG. 2 to FIG. 9 may be run on a general computing device including processing elements and storage elements such as a central processing unit (CPU), a random access memory (RAM), and a read-only memory (ROM), to construct the data transmission apparatus 110 shown in FIG. 11 and implement the data transmission method in some embodiments. The computer program may be recorded in, for example, a computer-readable storage medium, and may be loaded into the foregoing computing device by using the computer-readable storage medium, and run on the computing device.

In some embodiments, when the permission authentication request sent by the first application program is received, the request object identifier carried by the permission authentication request may be authenticated according to the permission object group identifier carried by the permission authentication request, and the authentication result may be returned to the first application program. The permission authentication request is sent after the first application program acquires, when detecting the operation request initiated for the document in the first application program, the document identifier of the document and the request object identifier, and acquires the permission object group identifier according to the document identifier. The permission object group identifier is used to represent a permission object group possessing the operation permission of the document, and the permission object group is created by the second application program. It can be seen from the foregoing solutions that, first, the permission object group is created and managed by the second application program, and the first application program cannot obtain information of each object in the permission object group, so that the need of privacy protection for the information of each object in the permission object group can be satisfied. In addition, by means of the permission object group, a permission object group can be added and set as the collaboration object of the document at a time, so that the setting efficiency of the collaboration object can be effectively improved. In addition, when the request object initiates an operation request for the document in the first application program, the second application program performs the authentication, so that the processing burden of the first application program can be effectively shared, and the maintenance cost can be reduced.

Figure 12:
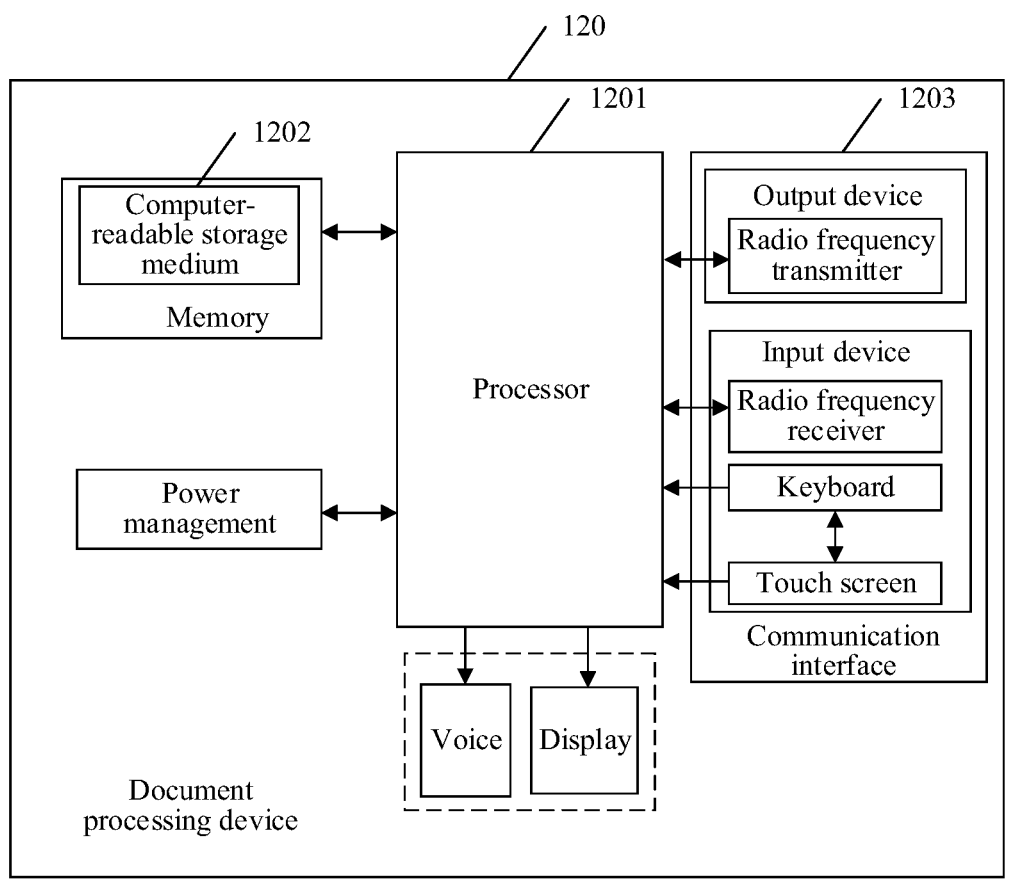
FIG. 12 is a schematic structural diagram of an electronic device used for data transmission according to some embodiments.

FIG. 12 is a schematic structural diagram of an electronic device used for data transmission according to some embodiments. The electronic device 120 includes at least a processor 1201, a computer-readable storage medium 1202, and a communication interface 1203. The processor 1201, the computer-readable storage medium 1202, and the communication interface 1203 may be connected to each other through a bus or in another manner. The communication interface 1203 may be configured to receive or transmit data. The computer-readable storage medium 1202 may be stored in a memory, and is configured to store a computer program, the computer program including computer instructions. The processor 1201 is configured to execute the computer instructions. The processor 1201 (or referred to as a central processing unit (CPU)) is a computing core and a control core of the electronic device 120. The processor 1201 is suitable for implementing one or more computer instructions, and is specifically suitable for loading and executing the one or more computer instructions to implement a corresponding method procedure or a corresponding function.

Some embodiments further provides a computer-readable storage medium (memory). The computer-readable storage medium is a memory device in the electronic device 120, and is configured to store programs and data. It may be understood that the computer-readable storage medium 1202 herein may include an internal storage medium in the electronic device 120, and certainly may also include an extended storage medium supported by the electronic device 120. The computer-readable storage medium provides storage space, and the storage space stores an operating system of the electronic device 120. In addition, the storage space further stores one or more computer instructions suitable for being loaded and executed by the processor 1201. The computer instructions may be at least one computer program (including program code). The computer-readable storage medium 1202 herein may be a high-speed RAM memory, or may be a non-volatile memory, such as at least one magnetic disk memory. The computer-readable storage medium 1202 may alternatively be at least one computer-readable storage medium far away from the foregoing processor 1201.

In some embodiments, the electronic device 120 may be configured to implement corresponding operations of the first application program. The computer-readable storage medium 1202 stores a computer program, and the computer program may include one or more first computer instructions. The one or more first computer instructions are loaded and executed by the processor 1201 to implement corresponding operations of the first application program in the method embodiments shown in FIG. 2 to FIG. 9. In a specific implementation, the one or more first computer instructions in the computer-readable storage medium 1202 are loaded by the processor 1201 to perform the following operations:

running a first application program on the first terminal; responding to an operation request for a document in the first application program to acquire a request object identifier and a document identifier of the document; acquiring a permission object group identifier of the document according to the document identifier, the permission object group identifier being used to represent a permission object group possessing an operation permission of the document, the permission object group being created by a second application program, and the permission object group including a plurality of authorization object identifiers; sending a permission authentication request for the request object identifier to the second application program, the permission authentication request being used to trigger the second application program to perform authentication processing on the request object identifier according to the permission object group identifier and return an authentication result, and the permission authentication request including the permission object group identifier and the request object identifier; and outputting a response page of the operation request according to the authentication result returned from the second application program.

In some embodiments, the one or more first computer instructions in the computer-readable storage medium 1202 are loaded and executed by the processor 1201 to further perform the following operations:

receiving a permission object group creation request sent by the second application program, the permission object group creation request including the document identifier and an application program identifier of the second application program; generating the permission object group identifier for the permission object group according to the permission object group creation request, and sending the permission object group identifier to the second application program; receiving an authorization request sent by the second application program, the authorization request including the permission object group identifier; and opening, based on the authorization request, the operation permission of the document to the permission object group corresponding to the permission object group identifier.

In some embodiments, when the one or more first computer instructions in the computer-readable storage medium 1202 are loaded by the processor 1201 to perform the operation of opening the operation permission of the document to the permission object group identifier, the one or more first computer instructions further perform the following operations:

performing correctness verification on the authorization request; adding the permission object group identifier to a document collaboration object list of the document in a case that the authorization request passes the correctness verification, the document collaboration object list including a plurality of collaboration object identifiers of the document, each collaboration object identifier in the document collaboration object list possessing the operation permission of the document, and the collaboration object identifier being used to identify a collaboration object; and sending an authorization response message to the second application program, the authorization response message being used to indicate that the permission object group corresponding to the permission object group identifier obtains the operation permission of the document.

In some embodiments, the application program identifier of the second application program and a callback link are stored in the first application program in an associated manner, the callback link being used to access the second application program; and When the one or more first computer instructions in the computer-readable storage medium 1202 are loaded by the processor 1201 to perform the operation of sending a permission authentication request to the second application program, the one or more first computer instructions further perform the following operations:

calling the callback link to send the permission authentication request to the second application program.

In some embodiments, a communication connection between the first application program and the second application program is established through a document authentication transmission protocol; and When the one or more first computer instructions in the computer-readable storage medium 1202 are loaded by the processor 1201 to perform the operation of sending a permission authentication request to the second application program, the one or more first computer instructions further perform the following operations:

encapsulating the permission authentication request into a permission authentication data packet, and sending the permission authentication data packet to the second application program based on the document authentication transmission protocol.

In some embodiments, the operation request includes a viewing request or an editing request, and the operation permission includes a viewing permission or an editing permission. In a case that the authentication result is that the authentication succeeds, the authentication result includes a type of operation permission possessed by the request object identifier. When the one or more first computer instructions in the computer-readable storage medium 1202 are loaded by the processor 1201 to perform the operation of outputting a response page of the operation request according to the authentication result, the one or more first computer instructions further perform the following operations:

outputting a first response page and displaying the document in the first response page, in a case that the authentication result is that the authentication succeeds; and performing an editing operation on the document according to the editing request in a case that the type of operation permission possessed by the request object identifier included in the authentication result is the editing permission.

In some embodiments, when the one or more first computer instructions in the computer-readable storage medium 1202 are loaded by the processor 1201 to perform the operation of outputting a response page of the operation request according to the authentication result, the one or more first computer instructions further perform the following operations:

outputting a second response page, in a case that the authentication result is that the authentication fails, the second response page including an authentication failure prompt message and a permission application option; and opening the operation permission of the document to the request object identifier based on a trigger operation for the permission application option.

In some embodiments, when an operation request initiated for a document in a first application program is detected, a document identifier of the document and a request object identifier are acquired. And, a permission object group identifier of the document is acquired according to the document identifier, the permission object group identifier being used to represent a permission object group possessing an operation permission of the document, and the permission object group being created by a second application program. A permission authentication request is sent to the second application program, the permission authentication request carrying the permission object group identifier and the request object identifier, and being used to trigger the second application program to perform authentication processing on the request object identifier according to the permission object group identifier and return an authentication result. A response page of the operation request is outputted according to the authentication result. It can be seen from the foregoing solutions that, first, by means of the permission object group, a permission object group can be added and set as the collaboration object of the document at a time, so that the setting efficiency of the collaboration object can be effectively improved. Moreover, the permission object group is created and managed by the second application program, and information of each object in the permission object group need not be exposed to the first application program, so that the need of privacy protection for the information of each object in the permission object group is satisfied. In addition, when the request object initiates an operation request for the document in the first application program, the second application program performs the authentication, so that the processing burden of the first application program can be effectively shared, and the maintenance cost can be reduced.

In some embodiments, the electronic device 120 may be configured to implement corresponding operations of the second application program. The computer-readable storage medium 1202 stores a computer program, and the computer program may include one or more second computer instructions. The one or more second computer instructions are loaded and executed by the processor 1201 to implement corresponding operations of the second application program in the method embodiments shown in FIG. 2 to FIG. 9. In a specific implementation, the one or more second computer instructions in the computer-readable storage medium 1202 are loaded by the processor 1201 to perform the following operations:

receiving a permission authentication request for a request object identifier sent by a first application program, the permission authentication request including a permission object group identifier and the request object identifier, where the first application program is run on the first terminal, and the first application program responds to an operation request of a document in the first application program to acquire the request object identifier and a document identifier of the document, and acquires a permission object group identifier of the document according to the document identifier, the permission object group identifier being used to represent a permission object group possessing an operation permission of the document, the permission object group being created by a second application program, and the permission object group including a plurality of authorization object identifiers; performing authentication processing on the request object identifier according to the permission object group identifier, to obtain an authentication result; and sending the authentication result to the first application program.

In some embodiments, the permission object group includes a plurality of authorization object identifiers, and each authorization object identifier in the permission object group possesses at least one operation permission of the document. When the one or more second computer instructions in the computer-readable storage medium 1202 are loaded by the processor 1201 to perform the operation of authenticating the request object identifier according to the permission object group identifier, the one or more second computer instructions further perform the following operations:

verifying whether the request object identifier is present in the permission object group; generating, in a case that the request object identifier is present in the permission object group, an authentication result that the authentication succeeds, acquiring a type of operation permission possessed by the request object identifier, and adding the type of operation permission possessed by the request object identifier to the authentication result that the authentication succeeds; and generating an authentication result that the authentication fails in a case that the request object identifier is not present in the permission object group.

In some embodiments, the one or more second computer instructions in the computer-readable storage medium 1202 are loaded and executed by the processor 1201 to further perform the following operations:

sending a permission object group creation request to the first application program, the permission object group creation request including the document identifier and an application program identifier of the second application program; receiving the permission object group identifier sent by the first application program, the permission object group identifier being generated by the first application program according to the permission object group creation request; creating the permission object group according to the permission object group identifier; and adding a plurality of authorization object identifiers to the permission object group, and configuring at least one operation permission for any one of the authorization object identifiers in the permission object group.

In some embodiments, the one or more first computer instructions in the computer-readable storage medium 1202 are loaded and executed by the processor 1201 to further perform the following operations:

receiving a permission application request sent by the first application program, the permission application request being sent by the first application program in a case that the authentication result is that the authentication fails, and the permission application request including the request object identifier; and adding, based on the permission application request, the request object identifier to the permission object group and configuring at least one operation permission for the request object identifier.

In some embodiments, when the permission authentication request sent by the first application program is received, the request object identifier carried by the permission authentication request may be authenticated according to the permission object group identifier carried by the permission authentication request, and the authentication result may be returned to the first application program. The permission authentication request is sent after the first application program acquires, when detecting the operation request initiated for the document in the first application program, the document identifier of the document and the request object identifier, and acquires the permission object group identifier according to the document identifier. The permission object group identifier is used to represent a permission object group possessing the operation permission of the document, and the permission object group is created by the second application program. It can be seen from the foregoing solutions that, first, the permission object group is created and managed by the second application program, and the first application program cannot obtain information of each object in the permission object group, so that the need of privacy protection for the information of each object in the permission object group can be satisfied. In addition, by means of the permission object group, a permission object group can be added and set as the collaboration object of the document at a time, so that the setting efficiency of the collaboration object can be effectively improved. In addition, when the request object initiates an operation request for the document in the first application program, the second application program performs the authentication, so that the processing burden of the first application program can be effectively shared, and the maintenance cost can be reduced.

According to some embodiments, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions, to cause the computer device to perform the data transmission method provided in the various embodiments.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A data transmission method, performed by a first terminal, the data transmission method comprising:
    running a first application program on the first terminal;
    acquiring a request object identifier and a document identifier of a document based on an operation request for the document in the first application program;
    acquiring a permission object group identifier of the document according to the document identifier, the permission object group identifier being used to represent a permission object group possessing an operation permission of the document, the permission object group having been created by a second application program, and the permission object group comprising a plurality of authorization object identifiers;
    sending a permission authentication request for the request object identifier to the second application program, the permission authentication request triggering the second application program to perform authentication processing on the request object identifier according to the permission object group identifier and return an authentication result, and the permission authentication request comprising the permission object group identifier and the request object identifier; and
    outputting a response page of the operation request according to the authentication result returned from the second application program.

2. The data transmission method according to claim 1, wherein before the responding to an operation request for a document in the first application program, the method further comprises:
    receiving a permission object group creation request sent by the second application program, the permission object group creation request comprising the document identifier and an application program identifier of the second application program;
    generating the permission object group identifier for the permission object group according to the permission object group creation request, and sending the permission object group identifier to the second application program;
    receiving an authorization request from the second application program, the authorization request comprising the permission object group identifier; and
    opening, based on the authorization request, the operation permission of the document to the permission object group corresponding to the permission object group identifier.

3. The data transmission method according to claim 2, wherein the opening the operation permission of the document comprises:
    performing correctness verification on the authorization request;
    adding the permission object group identifier to a document collaboration object list of the document in a case that the authorization request passes the correctness verification, the document collaboration object list comprising a plurality of collaboration object identifiers of the document, each collaboration object identifier in the document collaboration object list possessing the operation permission of the document, and the collaboration object identifier being used to identify a collaboration object; and
    sending an authorization response message to the second application program, the authorization response message being used to indicate that the permission object group corresponding to the permission object group identifier obtains the operation permission of the document.

4. The data transmission method according to claim 1, wherein
    the application program identifier of the second application program and a callback link are stored in the first application program in an associated manner, the callback link being used to access the second application program; and the sending a permission authentication request comprises:

calling the callback link to send the permission authentication request to the second application program.

5. The data transmission method according to claim 1, wherein a communication connection between the first application program and the second application program is established through a document authentication transmission protocol; and the sending a permission authentication request comprises:

encapsulating the permission authentication request into a permission authentication data packet, and sending the permission authentication data packet to the second application program based on the document authentication transmission protocol.

6. The data transmission method according to claim 1, wherein the operation request comprises a viewing request or an editing request, and the operation permission comprises a viewing permission or an editing permission;

when the authentication result indicates that the authentication succeeds, the authentication result comprises a type of operation permission possessed by the request object identifier; and the outputting comprises:

outputting a first response page and displaying the document in the first response page, in a case that the authentication result is that the authentication succeeds; and performing an editing operation on the document according to the editing request in a case that the type of operation permission possessed by the request object identifier comprised in the authentication result is the editing permission.

7. The data transmission method according to claim 1, wherein the outputting comprises:

outputting a second response page, when the authentication result indicates that the authentication fails, the second response page comprising an authentication failure prompt message and a permission application option; and opening the operation permission of the document to the request object identifier based on a trigger operation for the permission application option.

8. A data transmission apparatus, comprising:

at least one memory configured to store program code; and at least one processor configured to read the program code and operate as instructed by the program code, the program code comprising:

acquisition code configured to cause at least one of the at least one processor to:

run a first application program on a first terminal, acquire a request object identifier and a document identifier of a document based on an operation request for the document in the first application program, and acquire a permission object group identifier of the document according to the document identifier, the permission object group identifier being used to represent a permission object group possessing an operation permission of the document, the permission object group having been created by a second application program, and the permission object group comprising a plurality of authorization object identifiers;

sending code configured to cause at least one of the at least one processor to send a permission authentication request for the request object identifier to the second application program, the permission authentication request triggering the second application program to perform authentication processing on the request object identifier according to the permission object group identifier and return an authentication result, and the permission authentication request comprising the permission object group identifier and the request object identifier; and processing code configured to cause at least one of the at least one processor to output a response page of the operation request according to the authentication result returned from the second application program.

9. The data transmission apparatus according to claim 8, wherein the program code further comprises:

receiving code configured to cause at least one of the at least one processor to receive a permission object group creation request sent by the second application program, the permission object group creation request comprising the document identifier and an application program identifier of the second application program; and the processing code is further configured to cause at least one of the at least one processor to generate the permission object group identifier for the permission object group according to the permission object group creation request, the sending code is further configured to cause at least one of the at least one processor to send the permission object group identifier to the second application program, the receiving code is further configured to cause at least one of the at least one processor to receive an authorization request from the second application program, the authorization request comprising the permission object group identifier; and the processing code is further configured to cause at least one of the at least one processor to open, based on the authorization request, the operation permission of the document to the permission object group corresponding to the permission object group identifier.

10. The data transmission apparatus according to claim 9, wherein the processing code is further configured to cause at least one of the at least one processor to:

perform correctness verification on the authorization request;

add the permission object group identifier to a document collaboration object list of the document in a case that the authorization request passes the correctness verification, the document collaboration object list comprising a plurality of collaboration object identifiers of the document, each collaboration object identifier in the document collaboration object list possessing the operation permission of the document, and the collaboration object identifier being used to identify a collaboration object; and send an authorization response message to the second application program, the authorization response message being used to indicate that the permission object group corresponding to the permission object group identifier obtains the operation permission of the document.

11. The data transmission apparatus according to claim 8, wherein the application program identifier of the second application program and a callback link are stored in the first application program in an associated manner, the callback link being used to access the second application program; and the sending code is further configured to cause at least one of the at least one processor to:

call the callback link to send the permission authentication request to the second application program.

12. The data transmission apparatus according to claim 8, wherein a communication connection between the first application program and the second application program is established through a document authentication transmission protocol; and the sending code is further configured to cause at least one of the at least one processor to:

encapsulate the permission authentication request into a permission authentication data packet, and send the permission authentication data packet to the second application program based on the document authentication transmission protocol.

13. The data transmission apparatus according to claim 8, wherein the operation request comprises a viewing request or an editing request, and the operation permission comprises a viewing permission or an editing permission;

when the authentication result indicates that the authentication succeeds, the authentication result comprises a type of operation permission possessed by the request object identifier; and the processing code is further configured to cause at least one of the at least one processor to:

output a first response page and displaying the document in the first response page, in a case that the authentication result is that the authentication succeeds; and perform an editing operation on the document according to the editing request in a case that the type of operation permission possessed by the request object identifier comprised in the authentication result is the editing permission.

14. The data transmission apparatus according to claim 8, wherein the processing code is further configured to cause at least one of the at least one processor to:

output a second response page, when the authentication result indicates that the authentication fails, the second response page comprising an authentication failure prompt message and a permission application option; and open the operation permission of the document to the request object identifier based on a trigger operation for the permission application option.

15. A non-transitory computer-readable storage medium, storing computer code that when executed by at least one processor cause the at least one processor to at least:

run a first application program on the first terminal;

acquire a request object identifier and a document identifier of a document based on an operation request for the document in the first application program;

acquire a permission object group identifier of the document according to the document identifier, the permission object group identifier being used to represent a permission object group possessing an operation permission of the document, the permission object group having been created by a second application program, and the permission object group comprising a plurality of authorization object identifiers;

send a permission authentication request for the request object identifier to the second application program, the permission authentication request triggering the second application program to perform authentication processing on the request object identifier according to the permission object group identifier and return an authentication result, and the permission authentication request comprising the permission object group identifier and the request object identifier; and output a response page of the operation request according to the authentication result returned from the second application program.

16. The non-transitory computer-readable storage medium according to claim 15, wherein before the respond to an operation request for a document in the first application program, the computer code further causes the at least one processor to at least:

receive a permission object group creation request sent by the second application program, the permission object group creation request comprising the document identifier and an application program identifier of the second application program;

generate the permission object group identifier for the permission object group according to the permission object group creation request, and send the permission object group identifier to the second application program;

receive an authorization request from the second application program, the authorization request comprising the permission object group identifier; and open, based on the authorization request, the operation permission of the document to the permission object group corresponding to the permission object group identifier.

17. The non-transitory computer-readable storage medium according to claim 16, wherein the open the operation permission of the document comprises:

performing correctness verification on the authorization request;

adding the permission object group identifier to a document collaboration object list of the document in a case that the authorization request passes the correctness verification, the document collaboration object list comprising a plurality of collaboration object identifiers of the document, each collaboration object identifier in the document collaboration object list possessing the operation permission of the document, and the collaboration object identifier being used to identify a collaboration object; and sending an authorization response message to the second application program, the authorization response message being used to indicate that the permission object group corresponding to the permission object group identifier obtains the operation permission of the document.

18. The non-transitory computer-readable storage medium according to claim 15, wherein the application program identifier of the second application program and a callback link are stored in the first application program in an associated manner, the callback link being used to access the second application program; and the send a permission authentication request comprises:

calling the callback link to send the permission authentication request to the second application program.

19. The non-transitory computer-readable storage medium according to claim 15, wherein
a communication connection between the first application program and the second application program is established through a document authentication transmission protocol; and
the send a permission authentication request comprises:
encapsulating the permission authentication request into a permission authentication data packet, and sending the permission authentication data packet to the second application program based on the document authentication transmission protocol.

20. The non-transitory computer-readable storage medium according to claim 15, wherein
the operation request comprises a viewing request or an editing request, and the operation permission comprises a viewing permission or an editing permission;
when the authentication result indicates that the authentication succeeds, the authentication result comprises a type of operation permission possessed by the request object identifier; and
the output comprises:
outputting a first response page and displaying the document in the first response page, in a case that the authentication result is that the authentication succeeds; and
performing an editing operation on the document according to the editing request in a case that the type of operation permission possessed by the request object identifier comprised in the authentication result is the editing permission.

* * * * *